United States Patent
Lifchits et al.

(10) Patent No.: US 7,333,280 B1
(45) Date of Patent: *Feb. 19, 2008

(54) SERVO WRITING A DISK DRIVE BY SYNCHRONIZING A SERVO WRITE CLOCK TO A REFERENCE PATTERN ON THE DISK AND COMPENSATING FOR REPEATABLE PHASE ERROR

(75) Inventors: Yakov M. Lifchits, San Jose, CA (US); Wing Ying, Fremont, CA (US); Yilin Cai, Fremont, CA (US); Siri S. Weerasooriya, Campbell, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 240 days.

This patent is subject to a terminal disclaimer.

(21) Appl. No.: 10/911,039

(22) Filed: Aug. 3, 2004

(51) Int. Cl.
*G11B 21/02* (2006.01)

(52) U.S. Cl. .......................................... 360/51; 360/75

(58) Field of Classification Search ..................... None
See application file for complete search history.

(56) References Cited

U.S. PATENT DOCUMENTS

| | | | |
|---|---|---|---|
| 3,987,636 A | 10/1976 | Hruska et al. |
| 5,430,661 A | 7/1995 | Fisher et al. |
| 5,541,784 A | 7/1996 | Cribbs et al. |
| 5,576,906 A | 11/1996 | Fisher et al. |
| 5,583,712 A | 12/1996 | Brunelle |
| 5,659,426 A | 8/1997 | Aoki |
| 5,668,679 A | 9/1997 | Swearingen et al. |
| 5,696,639 A | 12/1997 | Spurbeck et al. |
| 5,754,352 A | 5/1998 | Behrens et al. |
| 5,754,353 A | 5/1998 | Behrens et al. |
| 5,761,212 A | 6/1998 | Foland, Jr. et al. |
| 5,793,559 A | 8/1998 | Shepherd et al. |
| 5,831,888 A | 11/1998 | Glover |
| 5,838,512 A | 11/1998 | Okazaki |
| 5,905,705 A | 5/1999 | Takeda et al. |

(Continued)

OTHER PUBLICATIONS

H. Melkote et. al, "A study of radial error propagation and self servowriting in disk drives", in Proceedings of the American Control Conference, Denver, CO, Jul. 2002.

(Continued)

*Primary Examiner*—Andrea Wellington
*Assistant Examiner*—Varsha A. Kapadia
(74) *Attorney, Agent, or Firm*—Howard H. Sheerin, Esq.

(57) ABSTRACT

A method of writing product servo sectors on a disk of a disk drive is disclosed. The disk comprises a reference pattern having a plurality of sync marks written around the disk. The sync marks are detected to generate a sync mark detect signal, and a timing recovery measurement is generated in response to the sync mark detect signal. A frequency control signal is generated in response to the timing recovery measurement, and a servo write clock is generated in response to the frequency control signal. A feed-forward compensation value is generated in response to the timing recovery measurement and the frequency control signal, and the timing recovery measurement is adjusted in response to the feed-forward compensation value to compensate for a repeatable phase error in the timing recovery measurement. The servo write clock and the head internal to the disk drive are used to write the product servo sectors to the disk.

16 Claims, 20 Drawing Sheets

U.S. PATENT DOCUMENTS

| | | | |
|---|---|---|---|
| 5,917,670 | A | 6/1999 | Scaramuzzo et al. |
| 6,021,012 | A | 2/2000 | Bang |
| 6,023,386 | A | 2/2000 | Reed et al. |
| 6,067,202 | A | 5/2000 | Rowan et al. |
| 6,069,499 | A | 5/2000 | Cho et al. |
| 6,091,564 | A | 7/2000 | Codilian et al. |
| 6,101,229 | A | 8/2000 | Glover |
| 6,111,710 | A | 8/2000 | Feyh et al. |
| 6,181,506 | B1 | 1/2001 | Shimura et al. |
| 6,191,906 | B1 | 2/2001 | Buch |
| 6,249,395 | B1 | 6/2001 | Conway |
| 6,249,896 | B1 | 6/2001 | Ho et al. |
| 6,262,857 | B1 * | 7/2001 | Hull et al. .................... 360/51 |
| 6,272,194 | B1 | 8/2001 | Sakamoto |
| 6,292,318 | B1 | 9/2001 | Hayashi |
| 6,304,407 | B1 | 10/2001 | Baker et al. |
| 6,307,697 | B1 | 10/2001 | Chainer et al. |
| 6,366,225 | B1 | 4/2002 | Ozdemir |
| 6,411,452 | B1 | 6/2002 | Cloke |
| 6,411,453 | B1 | 6/2002 | Chainer et al. |
| 6,429,989 | B1 | 8/2002 | Schultz et al. |
| 6,487,032 | B1 | 11/2002 | Cloke et al. |
| 6,507,450 | B1 | 1/2003 | Elliott |
| 6,519,107 | B1 | 2/2003 | Ehrlich et al. |
| 6,587,293 | B1 | 7/2003 | Ding et al. |
| 6,603,622 | B1 | 8/2003 | Christiansen et al. |
| 6,608,731 | B2 | 8/2003 | Szita |
| 6,683,744 | B2 | 1/2004 | Takano et al. |
| 6,704,156 | B1 | 3/2004 | Baker et al. |
| 6,710,957 | B2 | 3/2004 | Nakasato |
| 6,735,031 | B2 | 5/2004 | Chainer et al. |
| 6,738,205 | B1 | 5/2004 | Moran et al. |
| 6,754,025 | B1 | 6/2004 | Shepherd et al. |
| 6,771,443 | B2 | 8/2004 | Szita et al. |
| 6,785,075 | B2 | 8/2004 | Bryant et al. |
| 6,791,777 | B2 | 9/2004 | Watanabe et al. |
| 6,839,195 | B2 | 1/2005 | Chainer et al. |
| 6,882,486 | B1 | 4/2005 | Kupferman |
| 6,924,960 | B1 | 8/2005 | Melkote et al. |
| 6,940,678 | B2 | 9/2005 | Kuo et al. |
| 6,943,978 | B1 * | 9/2005 | Lee .............................. 360/75 |
| 6,954,325 | B2 | 10/2005 | Liu et al. |
| 6,963,465 | B1 | 11/2005 | Melkote et al. |
| 6,965,489 | B1 | 11/2005 | Lee et al. |
| 6,967,799 | B1 * | 11/2005 | Lee .............................. 360/51 |
| 6,985,316 | B1 | 1/2006 | Liikanen et al. |
| 6,989,954 | B1 * | 1/2006 | Lee et al. ..................... 360/75 |
| 7,002,761 | B1 | 2/2006 | Sutardja et al. |
| 7,016,134 | B1 * | 3/2006 | Agarwal et al. .............. 360/51 |
| 7,023,631 | B2 | 4/2006 | Zhang et al. |
| 7,027,247 | B2 | 4/2006 | Heydari et al. |
| 7,054,083 | B2 | 5/2006 | Ehrlich |
| 7,068,461 | B1 | 6/2006 | Chue et al. |
| 7,088,533 | B1 | 8/2006 | Shepherd et al. |
| 7,212,364 | B1 | 5/2007 | Lee |
| 2001/0010604 | A1 | 8/2001 | Esumi |
| 2003/0030929 | A1 | 2/2003 | Ozdemir |
| 2003/0048562 | A1 | 3/2003 | Heydari et al. |
| 2003/0184906 | A1 | 10/2003 | Hanson et al. |
| 2006/0007585 | A1 | 1/2006 | Ehrlich et al. |

OTHER PUBLICATIONS

D. Arzelier, D. Peaucelle, "An iterative method for mixed H2/Hinfinity synthesis via static output-feedback", CDC, Las Vegas, 2002.

A. Sacks, M. Bodson, W. Messner, "Advanced Methods for Repeatable Runout Compensation", IEEE Transactions on Magnetics, vol. 31, No. 2, Mar. 1995.

* cited by examiner

SERVO WRITING A DISK DRIVE BY SYNCHRONIZING A SERVO WRITE CLOCK TO A REFERENCE PATTERN ON THE DISK AND COMPENSATING FOR REPEATABLE PHASE ERROR

CROSS REFERENCE TO RELATED APPLICATIONS AND PATENTS

This application is related to co-pending U.S. patent application Ser. No. 10/769,387 entitled "USING AN EXTERNAL SPIRAL SERVO WRITER TO WRITE REFERENCE SERVO SECTORS AND SPIRAL TRACKS TO A DISK TO FACILITATE WRITING PRODUCT SERVO SECTORS TO THE DISK" filed on Jan. 30, 2004, the disclosure of which is incorporated herein by reference.

BACKGROUND OF THE INVENTION

1. Field of the Invention

The present invention relates to disk drives. More particularly, the present invention relates to servo writing a disk drive by synchronizing a servo write clock to a reference pattern on the disk and compensating for repeatable phase error.

2. Description of the Prior Art

When manufacturing a disk drive, product servo sectors $2_0$–$2_N$ are written to a disk 4 which define a plurality of radially-spaced, concentric data tracks 6 as shown in the prior art disk format of FIG. 1. Each product servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. During normal operation, the servo bursts 14 are processed by the disk drive in order to maintain a head over a centerline of a target track while writing or reading data. In the past, external servo writers have been used to write the product servo sectors $2_0$–$2_N$ to the disk surface during manufacturing. External servo writers employ extremely accurate head positioning mechanics, such as a laser interferometer, to ensure the product servo sectors $2_0$–$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. For example, U.S. Pat. No. 5,668,679 teaches a disk drive which performs a self-servo writing operation by writing a plurality of spiral tracks to the disk which are then processed to write the product servo sectors along a circular path. Each spiral track is written to the disk as a high frequency signal (with missing bits), wherein the position error signal (PES) for tracking is generated relative to time shifts in the detected location of the spiral tracks. In addition, the '679 patent generates a servo write clock by synchronizing a phase-locked loop (PLL) to the missing bits in the spiral tracks, wherein the servo write clock is used to write the product servo sectors at the appropriate circular location as well as at the appropriate frequency. However, the '679 patent does not compensate for the repeatable phase error caused by position errors in the missing bits when the spiral tracks are written to the disk. The repeatable phase error causes phase incoherency in the product servo sectors of adjacent tracks when servo writing the disk from the spiral tracks.

There is, therefore, a need to self-servo write a disk of a disk drive by synchronizing a servo write clock to a reference pattern prewritten on the disk, and compensating for repeatable phase errors in the reference pattern.

SUMMARY OF THE INVENTION

The present invention may be regarded as a method of writing product servo sectors on a disk of a disk drive. The disk drive comprises control circuitry and a head disk assembly (HDA) comprising the disk, an actuator arm, a head coupled to a distal end of the actuator arm, and a voice coil motor for rotating the actuator arm about a pivot to position the head radially over the disk. The disk comprises a reference pattern having a plurality of sync marks written around the disk. The head internal to the disk drive is used to read the reference pattern to generate a read signal. The sync marks are detected from the read signal to generate a sync mark detect signal, and a timing recovery measurement is generated in response to the sync mark detect signal. A frequency control signal is generated in response to the timing recovery measurement, and a servo write clock is generated in response to the frequency control signal. A feed-forward compensation value is generated in response to the timing recovery measurement and the frequency control signal, and the timing recovery measurement is adjusted in response to the feed-forward compensation value to compensate for a repeatable phase error in the timing recovery measurement. The servo write clock and the head internal to the disk drive are used to write the product servo sectors to the disk.

In one embodiment, the repeatable phase error is caused by a position error in the sync marks written on the disk.

In another embodiment, the reference pattern comprises a high frequency signal interrupted periodically by one of the sync marks. In one embodiment, the disk comprises a plurality of spiral tracks and each spiral track comprises the high frequency signal interrupted periodically by one of the sync marks. In another embodiment, the step of generating the timing recovery measurement comprises the step of generating a coarse timing recovery measurement from the sync mark detect signal and a fine timing recovery measurement from the high frequency signal.

In yet another embodiment, the step of generating the feed-forward compensation value comprises the steps of computing a plurality of phase error increments $d r \phi_{k+1}'$ according to:

$$d r \phi_{k+1}' = tr(k) - tr(k+1) - U(k)$$

where $U(k)$ is the frequency control signal. In one embodiment, the step of generating the feed-forward compensation value further comprises the steps of computing a DC_OFFSET phase error according to:

$$\text{DC\_OFFSET} = \left( \sum_{i=1}^{N} d r \phi_i' \right) \div N;$$

and computing a plurality of feed-forward compensation values $r\phi_k$ corresponding to the plurality of the sync marks according to:

$$r\phi_k = \sum_{i=1}^{k} (dr\phi'_i - \text{DC\_OFFSET}).$$

In another embodiment, the step of writing the product servo sectors to the disk defines a plurality of tracks on the disk, and the feed-forward compensation values generated while writing the product servo sectors to a first track are used to generate the feed-forward compensation values to write the product servo sectors to a second track.

The present invention may also be regarded as a disk drive comprising a disk comprising a reference pattern having a plurality of sync marks written around the disk, an actuator arm, a head coupled to a distal end of the actuator arm, and a voice coil motor for rotating the actuator arm about a pivot to position the head radially over the disk. The head internal to the disk drive is used to read the reference pattern to generate a read signal. The sync marks are detected from the read signal to generate a sync mark detect signal, and a timing recovery measurement is generated in response to the sync mark detect signal. A frequency control signal is generated in response to the timing recovery measurement, and a servo write clock is generated in response to the frequency control signal. A feed-forward compensation value is generated in response to the timing recovery measurement and the frequency control signal, and the timing recovery measurement is adjusted in response to the feed-forward compensation value to compensate for a repeatable phase error in the timing recovery measurement. The servo write clock and the head internal to the disk drive are used to write the product servo sectors to the disk.

DESCRIPTION OF THE PREFERRED EMBODIMENTS

Figure 2:
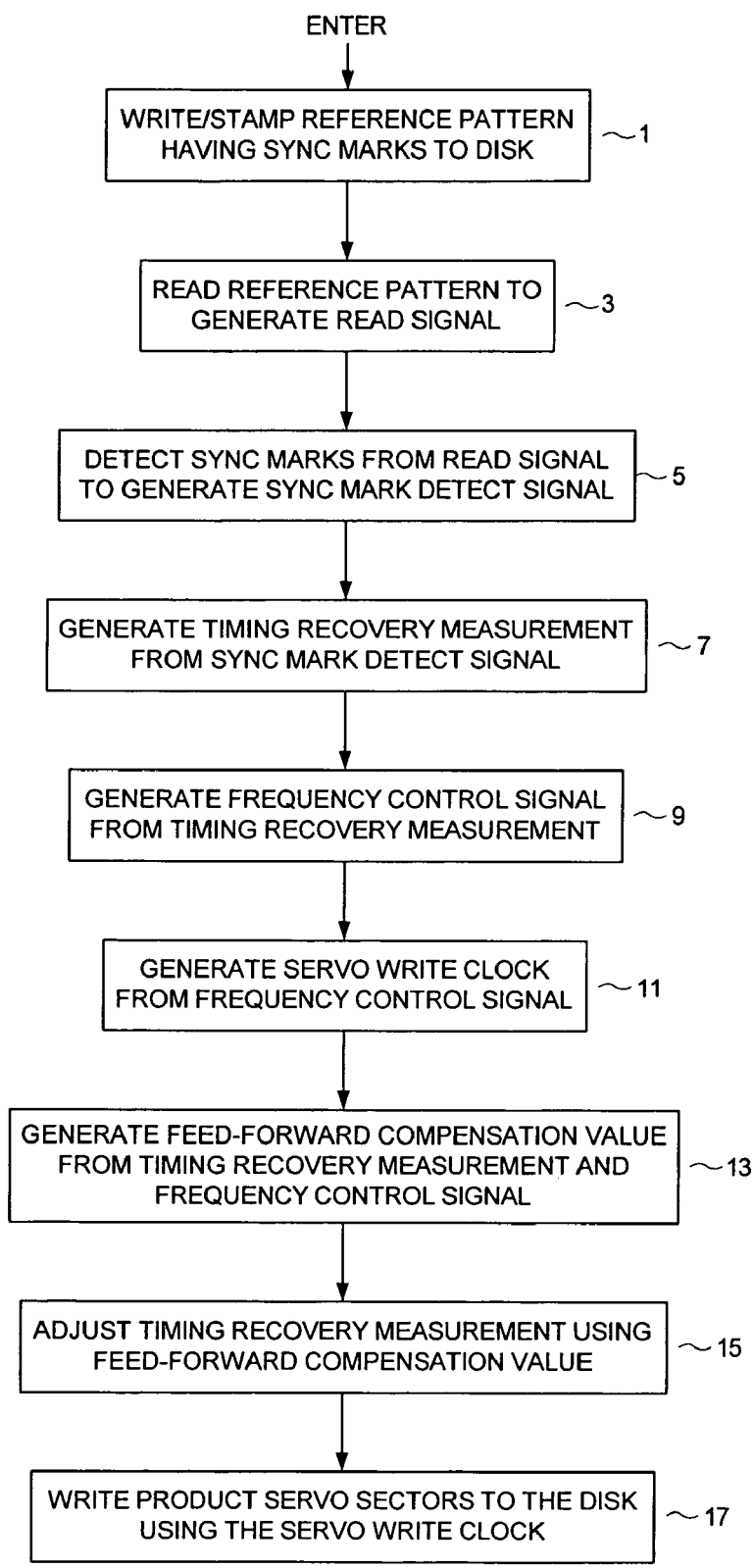
FIG. 2 is a flow diagram according to an embodiment of the present invention for servo writing a disk drive from a reference pattern by generating feed-forward compensation values that compensate for repeatable phase errors in the reference pattern.

FIG. 2 shows a method of writing product servo sectors on a disk of a disk drive according to an embodiment of the present invention. The disk drive comprises control circuitry and a head disk assembly (HDA) comprising the disk, an actuator arm, a head coupled to a distal end of the actuator arm, and a voice coil motor for rotating the actuator arm about a pivot to position the head radially over the disk. At step 1, a reference pattern having a plurality of sync marks is written (or stamped) onto the disk. At step 3, the head internal to the disk drive is used to read the reference pattern to generate a read signal. At step 5, the sync marks are detected from the read signal to generate a sync mark detect signal, and at step 7 a timing recovery measurement is generated in response to the sync mark detect signal. At step 9, a frequency control signal is generated in response to the timing recovery measurement, and at step 11 a servo write clock is generated in response to the frequency control signal. At step 13, a feed-forward compensation value is generated in response to the timing recovery measurement and the frequency control signal, and at step 15 the timing recovery measurement is adjusted in response to the feed-forward compensation value to compensate for a repeatable phase error in the timing recovery measurement. At step 17, the servo write clock and the head internal to the disk drive are used to write the product servo sectors to the disk.

Figures 3A, 3B:
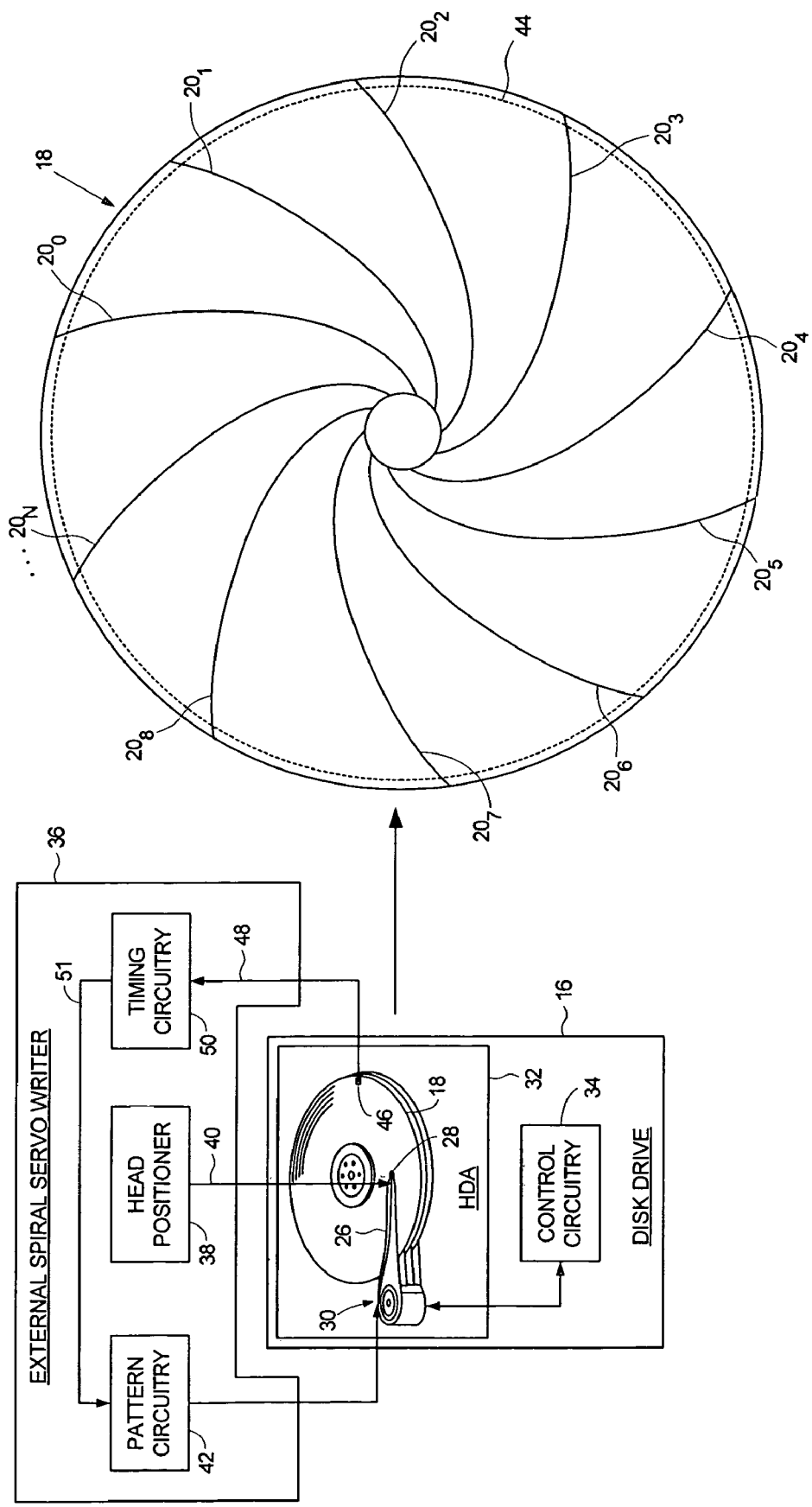
FIGS. 3A and 3B illustrate an embodiment of the present invention wherein an external spiral servo writer is used to write a plurality of spiral tracks to the disk for use in writing product servo sectors to the disk.

The reference pattern may comprise any suitable pattern and may be written to the disk using any suitable technique, such as using an external writer for writing the reference pattern to the disk, or stamping the reference pattern on the disk using magnetic printing techniques. FIGS. 3A and 3B show an embodiment wherein a plurality of spiral tracks $20_0$–$20_N$ are written to a disk 18 of a disk drive 16 using an external spiral servo writer 36. The disk drive 16 comprises control circuitry 34 and a head disk assembly (HDA) 32 comprising the disk 18, an actuator arm 26, a head 28 coupled to a distal end of the actuator arm 26, and a voice coil motor 30 for rotating the actuator arm 26 about a pivot to position the head 28 radially over the disk 18. A write clock is synchronized to the rotation of the disk 18, and the plurality of spiral tracks $20_0$–$20_N$ are written on the disk 18 at a predetermined circular location determined from the write clock. Each spiral track $20_i$ comprises a high frequency signal 22 (FIG. 5B) interrupted at a predetermined interval by a sync mark 24.

The external spiral servo writer 36 comprises a head positioner 38 for actuating a head positioning pin 40 using sensitive positioning circuitry, such as a laser interferometer. Pattern circuitry 42 generates the data sequence written to the disk 18 for the spiral tracks $20_0$–$20_N$. The external spiral servo writer 36 inserts a clock head 46 into the HDA 32 for writing a clock track 44 (FIG. 3B) at an outer diameter of the disk 18. The clock head 46 then reads the clock track 44 to generate a clock signal 48 processed by timing recovery circuitry 50 to synchronize the write clock 51 for writing the spiral tracks $20_0$–$20_N$ to the disk 18. The timing recovery circuitry 50 enables the pattern circuitry 42 at the appropriate time relative to the write clock 51 so that the spiral tracks $20_0$–$20_N$ are written at the appropriate circular location. The timing recovery circuitry 50 also enables the pattern circuitry 42 relative to the write clock 51 to write the sync marks 24 (FIG. 5B) within the spiral tracks $20_0$–$20_N$ at the same circular location from the outer diameter to the inner diameter of the disk 18. As described below with reference to FIG. 6, the constant interval between sync marks 24 (independent of the radial location of the head 28) enables the servo write clock to maintain synchronization while writing the product servo sectors to the disk.

Figure 4:
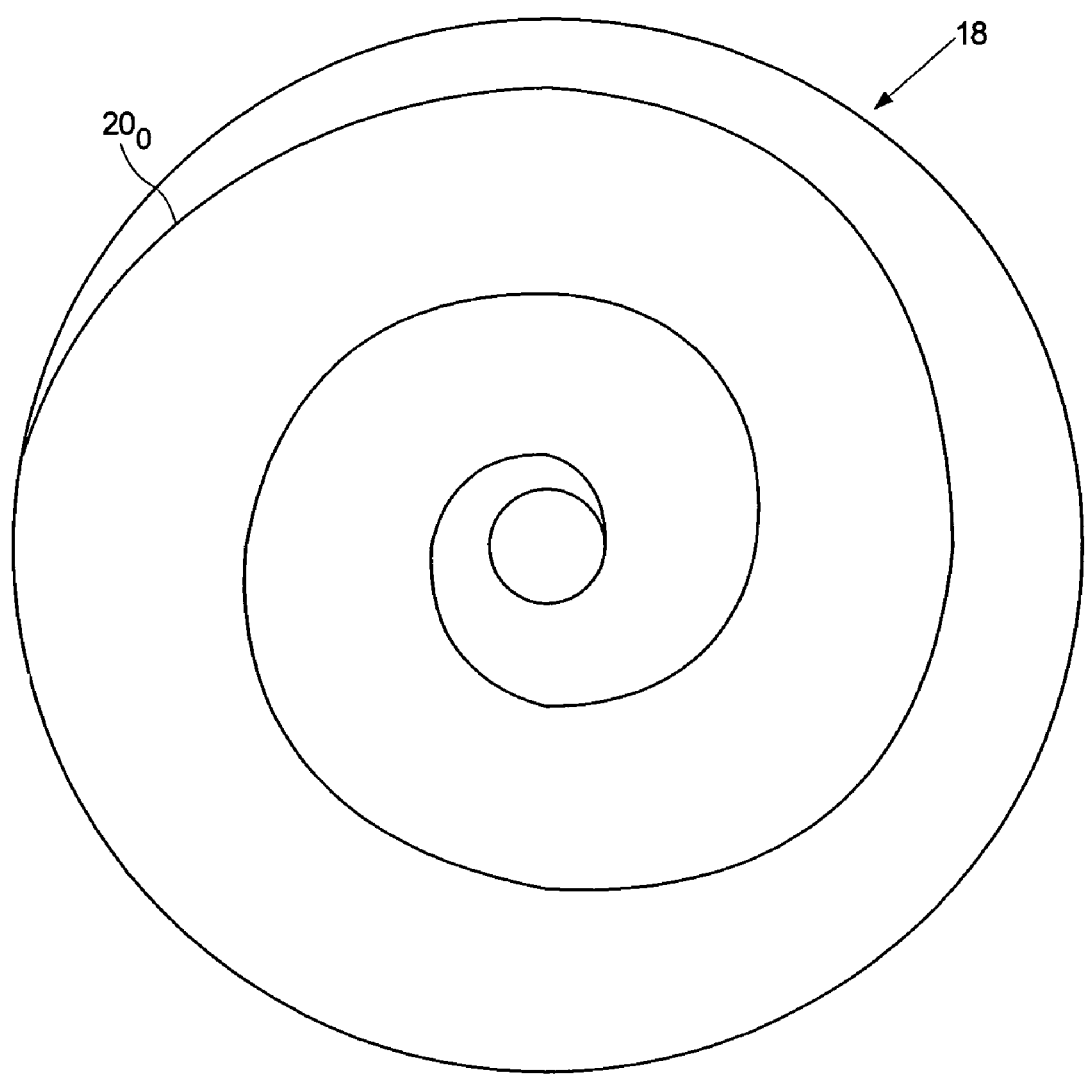
FIG. 4 illustrates an embodiment of the present invention wherein each spiral track is written over multiple revolutions of the disk.

In the embodiment of FIG. 3B, each spiral track $20_i$ is written over a partial revolution of is the disk 18. In an alternative embodiment, each spiral track $20_i$ is written over one or more revolutions of the disk 18. FIG. 4 shows an embodiment wherein each spiral track $20_i$ is written over multiple revolutions of the disk 18. In the embodiment of FIG. 3A, the entire disk drive 16 is shown as being inserted into the external spiral servo writer 36. In an alternative embodiment, only the HDA 32 is inserted into the external spiral servo writer 36. In yet another embodiment, an external media writer is used to write the spiral tracks $20_0$–$20_N$ to a number of disks 18, and one or more of the disks 18 are then inserted into an HDA 32.

Referring again to the embodiment of FIG. 3A, after the external spiral servo writer 36 writes the spiral tracks $20_0$–$20_N$ to the disk 18, the head positioning pin 40 and clock head 46 are removed from the HDA 32 and the product servo sectors are written to the disk 18. In one embodiment, the control circuitry 34 within the disk drive 16 is used to process the spiral tracks $20_0$–$20_N$ in order to write the product servo sectors to the disk 18. In an alternative embodiment described below with reference to FIGS. 17 and 18, an external product servo writer is used to process the spiral tracks $20_0$–$20_N$ in order to write the product servo sectors to the disk 18 during a "fill operation".

Figure 5A:
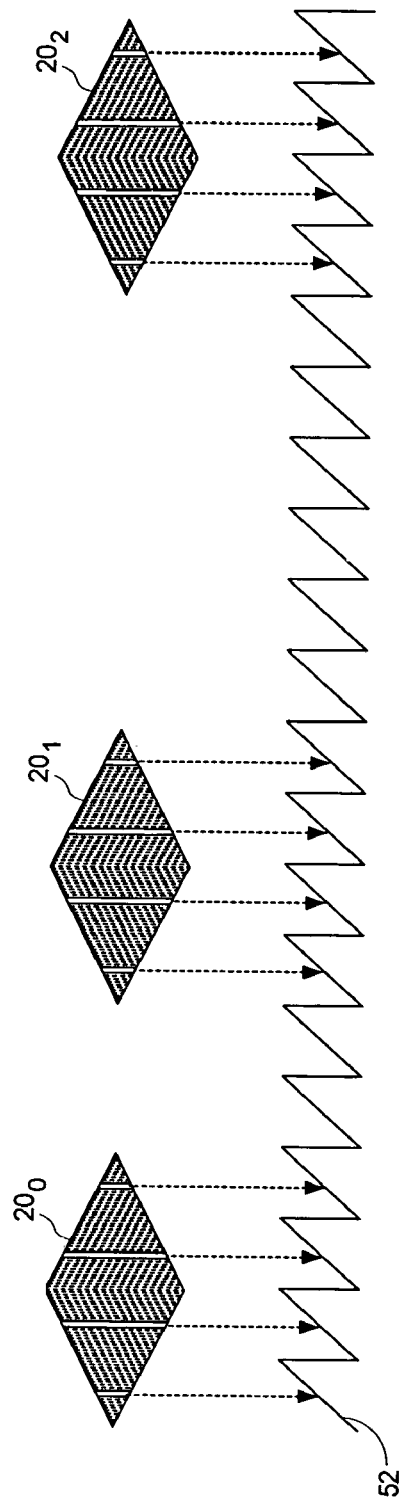
FIG. 5A shows an embodiment of the present invention wherein a servo write clock is synchronized by clocking a modulo-N counter relative to when the sync marks in the spiral tracks are detected.
Figure 5B:
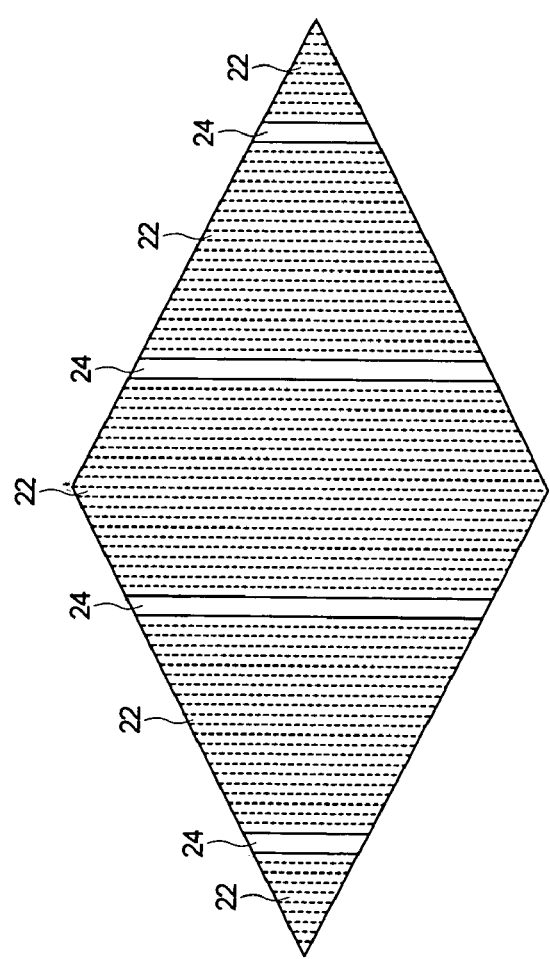
FIG. 5B shows an eye pattern generated by reading the spiral track, including the sync marks in the spiral track.

FIG. 5B illustrates an "eye" pattern in the read signal that is generated when the head 28 passes over a spiral track 20. The read signal representing the spiral track comprises high frequency transitions 22 interrupted by sync marks 24. When the head 28 moves in the radial direction, the eye pattern will shift (left or right) while the sync marks 24 remain fixed. The shift in the eye pattern (detected from the high frequency signal 22) relative to the sync marks 24 provides the off-track information (position error signal or PES) for serving the head 28.

FIG. 5A shows an embodiment of the present invention wherein a saw-tooth waveform 52 is generated by clocking a modulo-N counter with the servo write clock, wherein the frequency of the servo write clock is adjusted until the sync marks 24 in the spiral tracks $20_0$–$20_N$ are detected at a target modulo-N count value. The servo write clock may be generated using any suitable circuitry, such as a phase locked loop (PLL). As each sync mark 24 in the spiral tracks $20_0$–$20_N$ is detected, the value of the modulo-N counter represents the phase error for adjusting the PLL. In one embodiment, the PLL is updated when any one of the sync marks 24 within the eye pattern is detected. In this manner the multiple sync marks 24 in each eye pattern (each spiral track crossing) provides redundancy so that the PLL is still updated if one or more of the sync marks 24 are missed due to noise in the read signal. Once the sync marks 24 are detected at the target modulo-N count values, the servo write clock is coarsely locked to the desired frequency for writing the product servo sectors to the disk 18.

Figure 1:
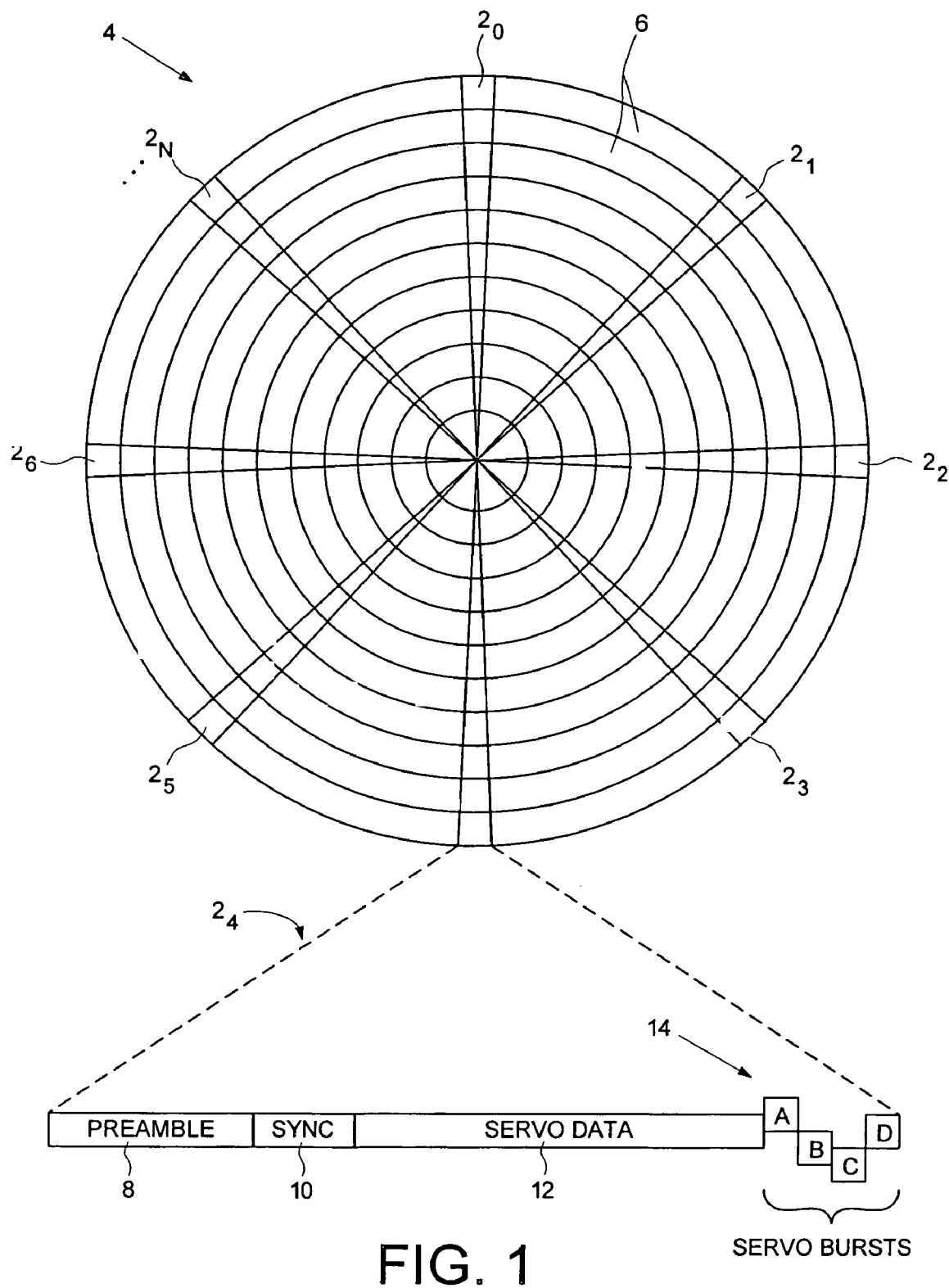
FIG. 1 shows a prior art disk format comprising a plurality of radially spaced, concentric tracks defined by a plurality of product servo sectors.

The sync marks 24 in the spiral tracks $20_0$–$20_N$ may comprise any suitable pattern, and in one embodiment, a pattern that is substantially shorter than the sync mark 10 in the conventional product servo sectors 2 of FIG. 1. A shorter sync mark 24 allows the spiral tracks $20_0$–$20_N$ to be written to the disk 18 using a steeper slope (by moving the head faster from the outer diameter to the inner diameter of the disk 18) which reduces the time required to write each spiral track $20_0$–$20_N$.

In one embodiment, the servo write clock is further synchronized by generating a timing recovery measurement from the high frequency signal 22 between the sync marks 24 in the spiral tracks $20_0$–$20_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock.

Figure 6:
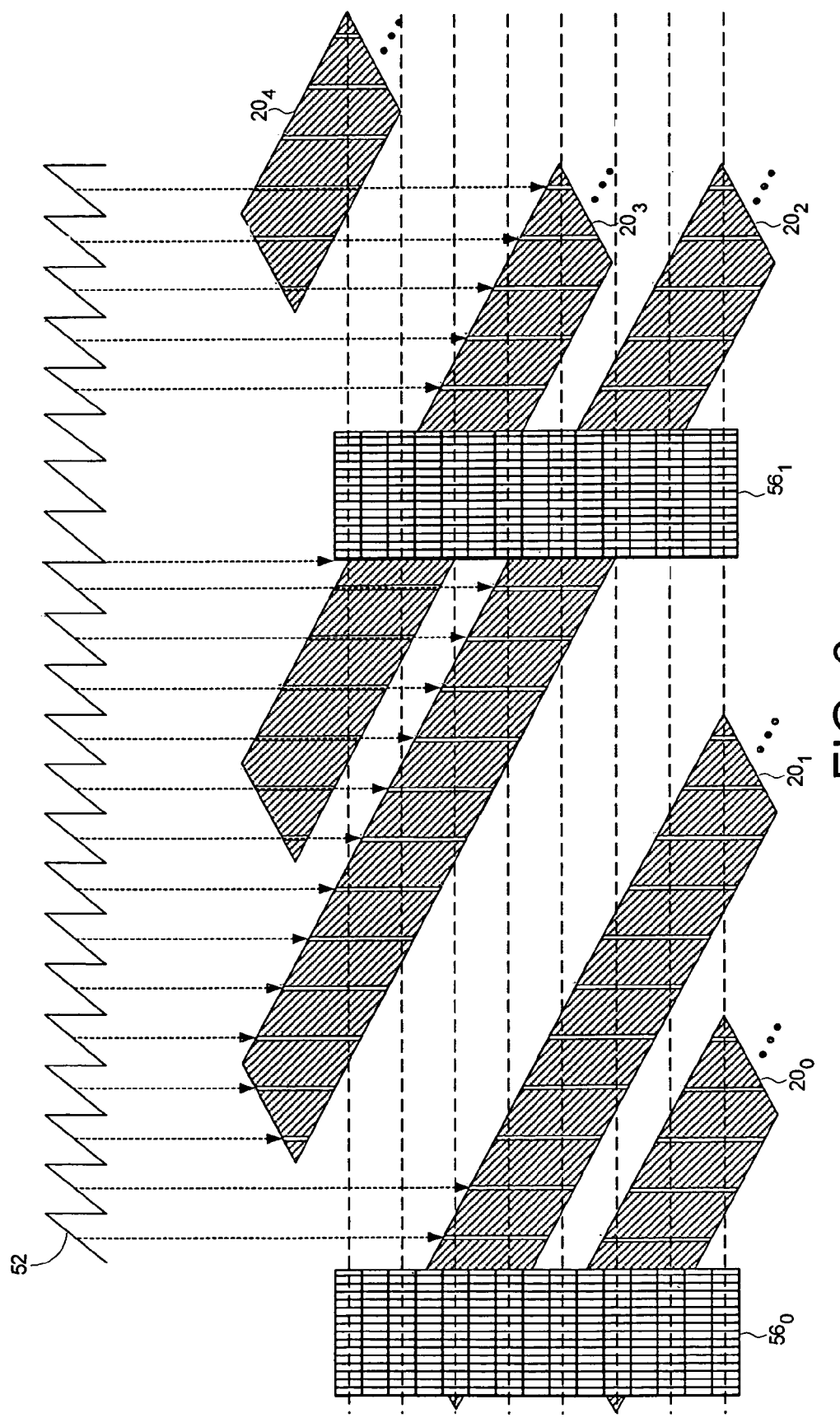
FIG. 6 illustrates writing of product servo sectors using a servo write clock generated from reading the spiral tracks.

FIG. 6 illustrates how the product servo sectors $56_0$–$56_N$ are written to the disk 18 after synchronizing the servo write clock in response to the high frequency signal 22 and the sync marks 24 in the spiral tracks $20_0$–$20_N$. In the embodiment of FIG. 6, the dashed lines represent the centerlines of the data tracks. The sync marks in the spiral tracks $20_0$–$20_N$ are written so that there is a shift of two sync marks 24 in the eye pattern (FIG. 5B) between data tracks. In an alternative embodiment, the sync marks 24 in the spiral tracks $20_0$–$20_N$ are written so that there is a shift of N sync marks in the eye pattern between data tracks. In the embodiment of FIG. 6, each spiral track $20_0$–$20_N$ is wider than a data track, however, in an alternative embodiment the width of each spiral track $20_0$–$20_N$ is less than or proximate the width of a data track.

The PES for maintaining the head 28 along a servo track (tracking) may be generated from the spiral tracks $20_0$–$20_N$ in any suitable manner. In one embodiment, the PES is generated by detecting the eye pattern in FIG. 5B using an envelope detector and detecting a shift in the envelope relative to the sync marks 24. In one embodiment, the envelope is detected by integrating the high frequency signal 22 and detecting a shift in the resulting ramp signal. In an alternative embodiment, the high frequency signal 22 between the sync marks 24 in the spiral tracks are demodulated as servo bursts and the PES generated by comparing the servo bursts in a similar manner as the servo bursts 14 in the product servo sectors (FIG. 1).

Once the head 28 is tracking on a servo track, the product servo sectors $56_0$–$56_N$ are written to the disk using the servo write clock. Write circuitry is enabled when the modulo-N counter reaches a predetermined value, wherein the servo write clock clocks the write circuitry to write the product servo sector 56 to the disk. The spiral tracks $20_0$–$20_N$ on the disk are processed in an interleaved manner to account for the product servo sectors $56_0$–$56_N$ overwriting a spiral track. For example, when writing the product servo sectors $56_1$ to the disk, spiral track $20_2$ is processed initially to generate the PES tracking error and the timing recovery measurement. When the product servo sectors $56_1$ begin to overwrite spiral track $20_2$, spiral track $20_3$ is processed to generate the PES tracking error and the timing recovery measurement.

Figure 7:
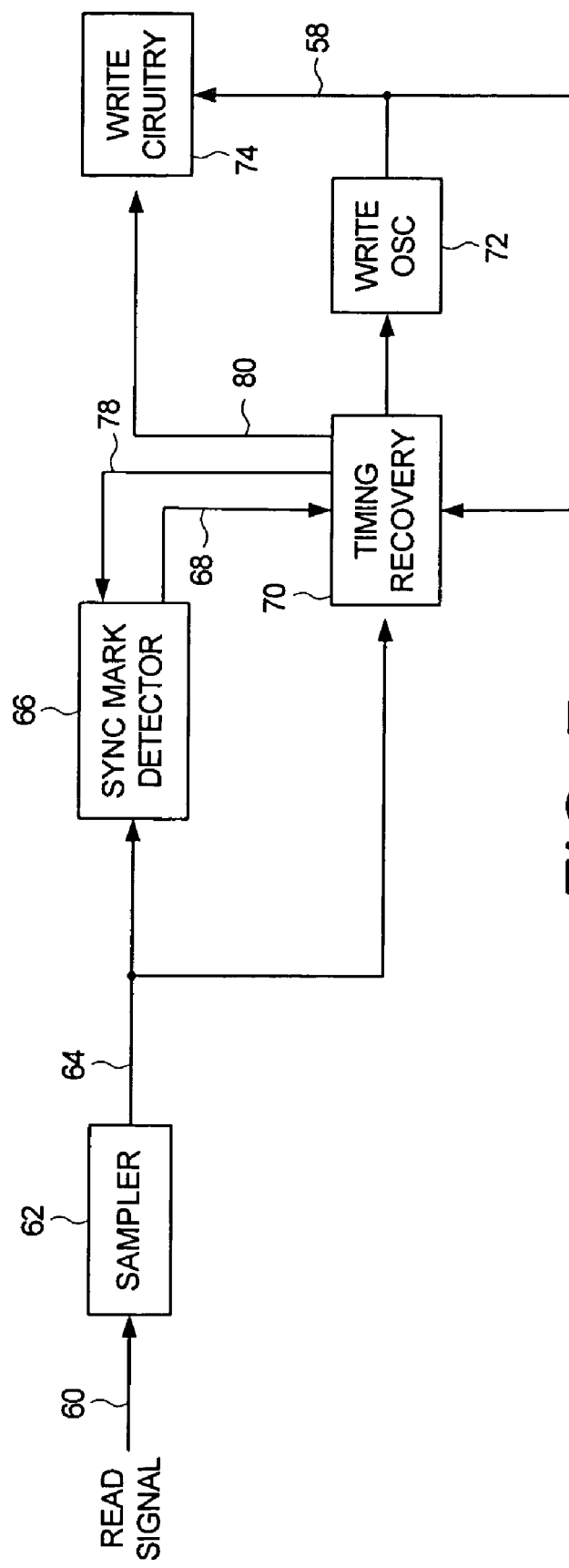
FIG. 7 shows circuitry according to an embodiment of the present invention for generating the servo write clock.

FIG. 7 shows details of control circuitry for synchronizing the servo write clock 58 according to an embodiment of the present invention. The read signal 60 emanating from the head 28 is sampled 62, and the read signal sample values 64 are processed by a sync mark detector 66 for detecting the sync marks 24 in the spiral tracks $20_0$–$20_N$. The sync mark detector 66 generates a sync mark detect signal 68 applied to a timing recovery circuit 70. The timing recovery circuit 70 processes the sync mark detect signal 68 to generate a coarse timing recovery measurement, and the read signal sample values 64 representing the high frequency signal 22 in the spiral tracks $20_0$–$20_N$ to generate a fine timing recovery measurement. The coarse and fine timing recovery measurements are combined to generate a control signal applied to a write oscillator 72 which outputs the servo write clock 58. The servo write clock 58 clocks operation of write circuitry 74 for writing the product servo sectors $56_0$–$56_N$ to the disk 18. The servo write clock 58 is also fed back into the timing recovery circuit 70 and used to generate the coarse timing recovery measurement. The timing recovery circuit 70 generates a sync mark detection window over line 78 for enabling the sync mark detector 66 during a window where a sync mark 24 is expected to occur. The timing recovery circuit 70 also generates a control signal over line 80 to enable the write circuitry 74 to begin writing a product servo sector at the appropriate time.

Figure 8:
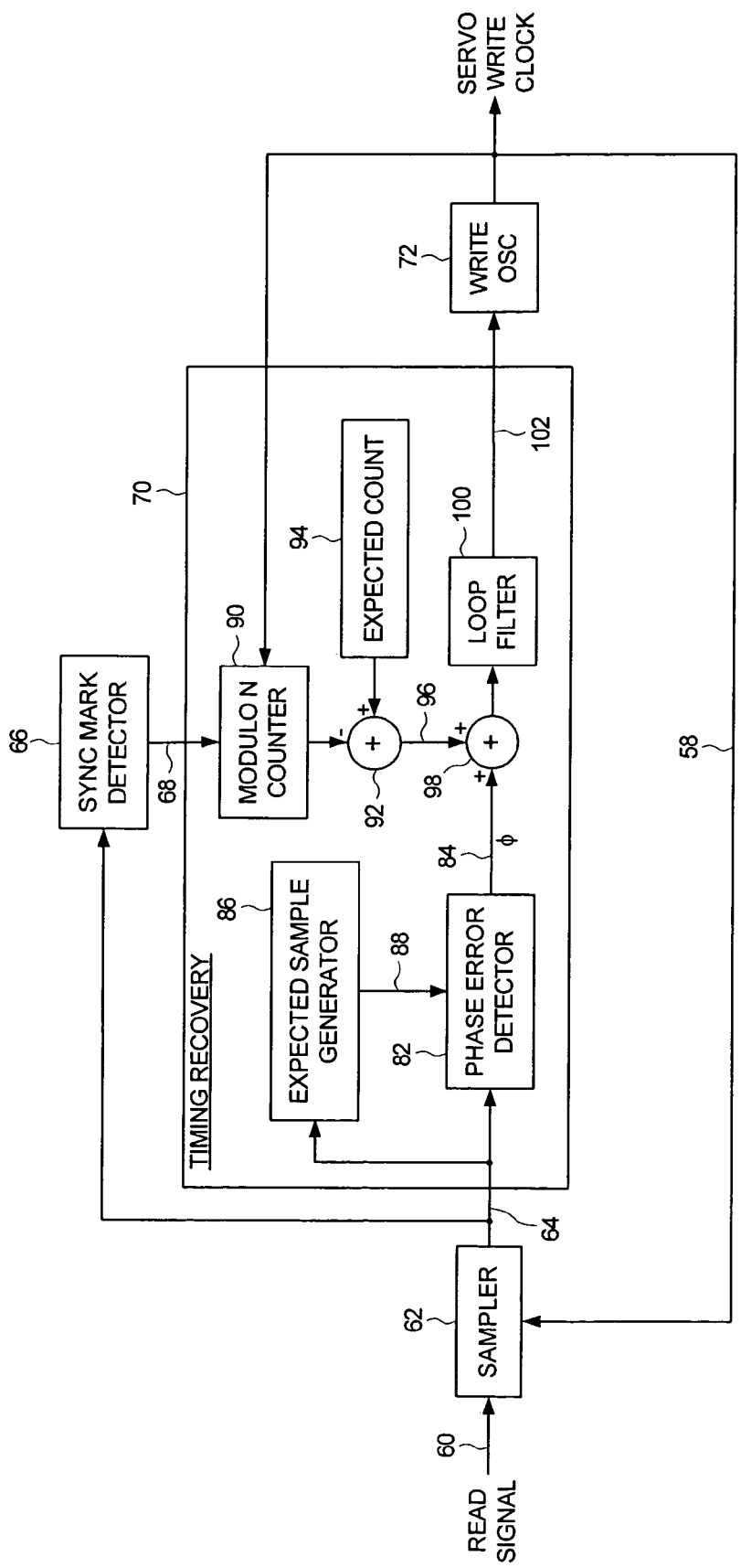
FIG. 8 shows an embodiment of the timing recovery circuitry wherein a fine phase error is generated from read signal sample values and expected sample values, and the servo write clock is used to synchronously sample the read signal.
Figure 9:
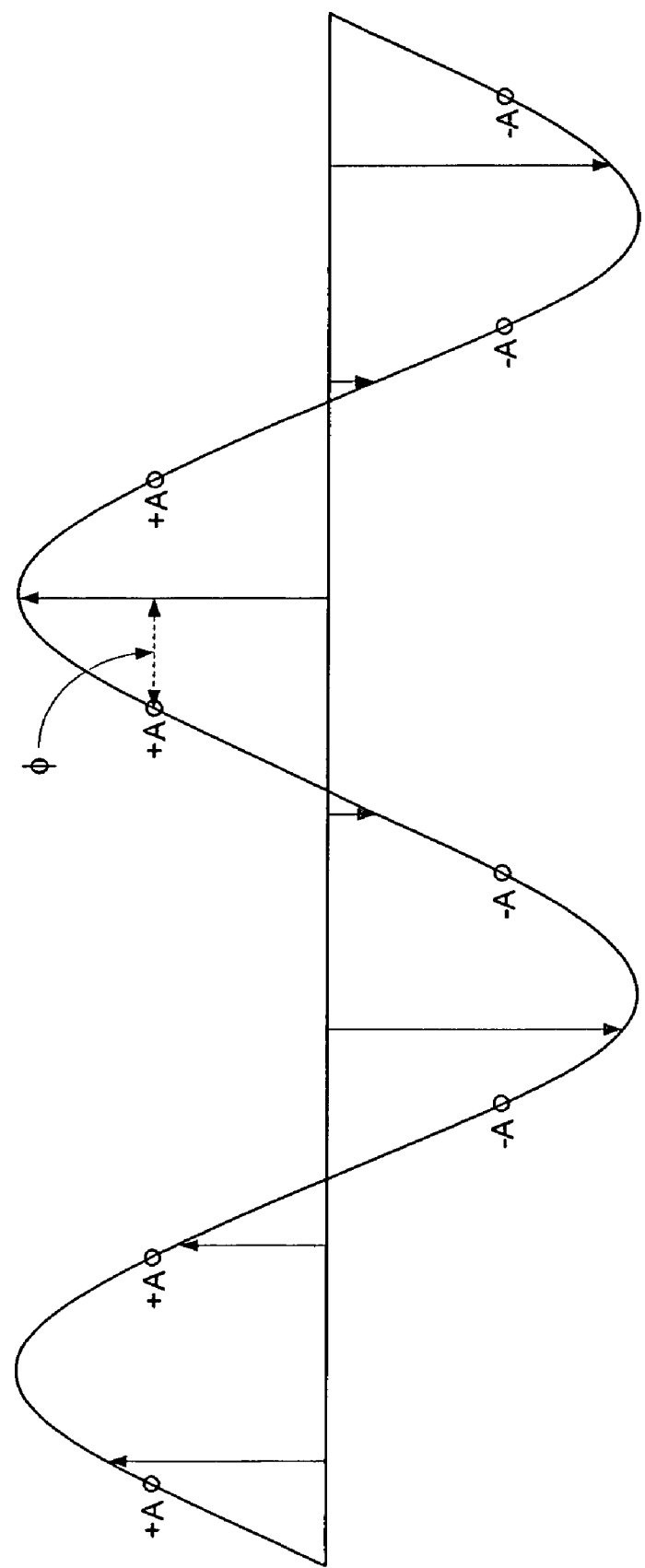
FIG. 9 illustrates the read signal sample values, the expected sample values, and the corresponding phase error.

FIG. 8 shows details of a suitable timing recovery circuit 70 according to an embodiment of the present invention wherein the servo write clock 58 is used to synchronously sample 62 the read signal 60 to generate synchronous read signal sample values 64. A phase error detector 82 detects a phase error $\phi 84$ between the read signal sample values 64 (arrows in FIG. 9) and expected sample values 88 (circles in FIG. 9). An expected sample generator 86 generates the expected sample values 88 input into the phase error detector 82. The phase error detector 82 generates the phase error $\phi 84$ by implementing a suitable stochastic gradient equation. In one embodiment, the expected sample generator 86 processes the read signal samples 64 to initialize a state machine which then outputs the expected sample values 88. Referring to FIG. 9, after being initialized the state machine generates the sequence ( . . . +A, +A, −A, −A, +A, +A, −A, −A . . . ). In one embodiment, a high bandwidth gain loop maintains the gain of the read signal sample values 64 at a target level to compensate for the amplitude variation in the read signal 60 (the eye pattern of FIG. 5B) as the head 28 passes over a spiral track 20. In an alternative embodiment, the amplitude A of the expected sample values 88 is adjusted relative to the amplitude of the read signal 60. For example, an envelope detector can track the amplitude of the eye pattern (FIG. 5B) and then adjust the amplitude A of the expected sample values 88 accordingly. However, any suitable technique may be used to generate the fine timing recovery measurement (phase error $\phi$) from the high frequency signal 22 in the spiral tracks 20. In one embodiment, a suitable trigonometric identity is employed to generate the phase error $\phi$ in a manner that is substantially independent of the amplitude variations in the read signal 60.

The servo write clock 58 also clocks a modulo N counter 90 (FIG. 8). When the sync mark detector 66 detects a sync mark 24 in a spiral track 20, the content of the modulo N counter 90 is subtracted 92 from an expected count value 94 to generate the coarse timing recovery measurement 96. The coarse timing recovery measurement 96 and the fine timing recovery measurement (phase error $\phi 84$) are combined 98 and filtered by a loop filter 100. The output of the loop filter 100 is a frequency control signal 102 applied to the write oscillator 72 in order to synchronize the servo write clock 58.

Figure 10:
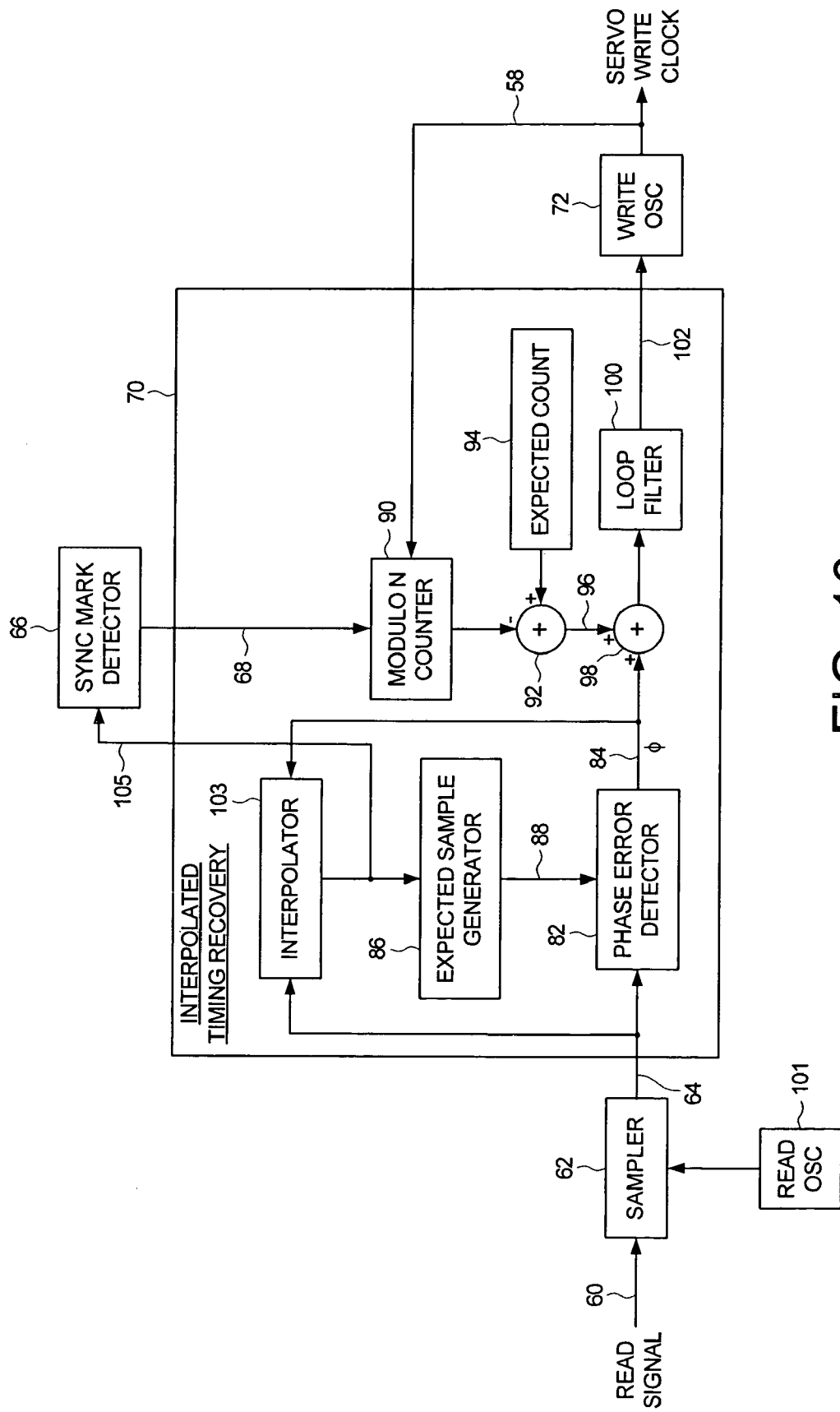
FIG. 10 shows an alternative embodiment wherein the timing recovery circuitry comprises an interpolator and a read oscillator is used to sample the read signal.

FIG. 10 shows details of a timing recovery circuit 70 according to an alternative embodiment of the present invention employing interpolated timing recovery (ITR). A read oscillator 101 samples 62 the reads signal 60 at a constant frequency to generate asynchronous sample values 64. A phase error detector 82 generates a phase error $\phi 84$ between the expected sample values 88 and the asynchronous sample values 64. An interpolator 103 interpolates the asynchronous sample values 64 using the phase error $\phi 84$ to generate synchronous sample values 105 processed by the sync mark detector 66 and the expected sample value generator 86. The interpolator 103 may employ any suitable circuitry, and in one embodiment implements a finite impulse response filter with variable coefficients for performing the interpolation. The remaining components in the timing recovery circuit 70 of FIG. 10 operate as described above with reference to FIG. 8 to generate a frequency control signal 102 applied to the write oscillator 72 in order to synchronize the servo write clock 58. In one embodiment, the read oscillator 101 and the write oscillator 72 are implemented on the same substrate so that they exhibit substantially the same center frequency and temperature drift.

Figure 11:
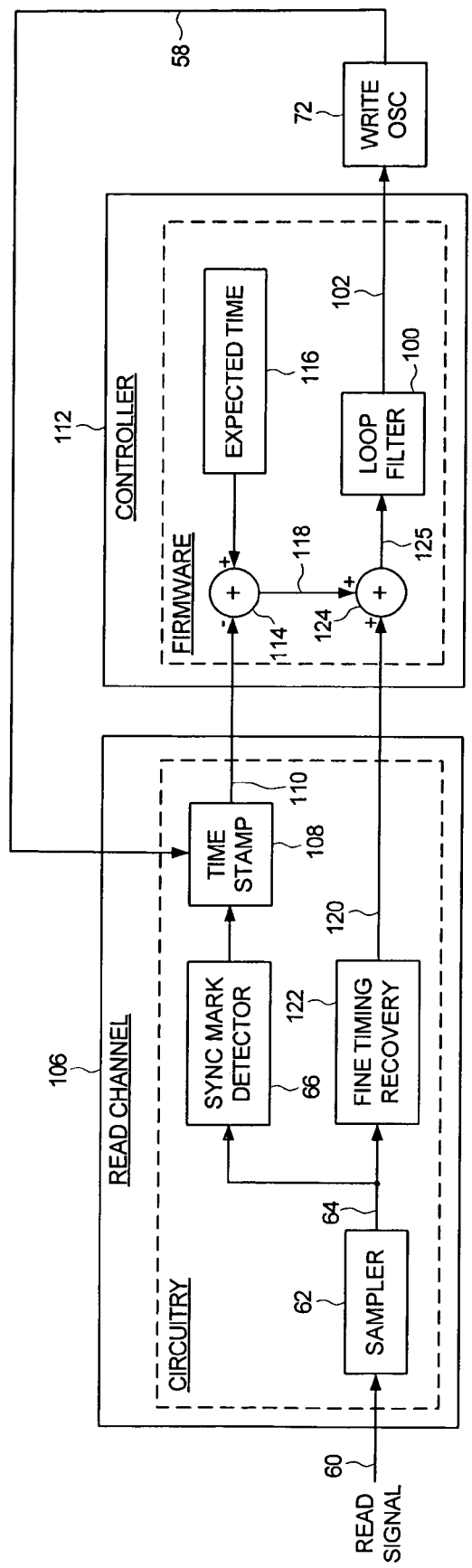
FIG. 11 shows an embodiment of the present invention wherein the sync mark detector is implemented in a read channel integrated circuit and a time-stamp sync mark detect signal is transmitted to a controller for processing in firmware to generate the coarse timing recovery measurement.

FIG. 11 shows an embodiment of the present invention wherein a read channel integrated circuit 106 comprises circuitry for implementing the sync mark detector 66 and time-stamp circuitry 108 for generating a time-stamped sync mark detect signal 110, wherein the time-stamped sync mark detect signal 110 represents a time when a sync mark in a spiral track was detected relative to the servo write clock 58. In the embodiment shown in FIG. 8, the time-stamp circuitry 110 comprises the modulo-N counter 90 wherein the time-stamp sync mark detect signal 110 is the value of the modulo-N counter 90 when a sync mark is detected. The time-stamped sync mark detect signal 110 is processed in firmware executed by a controller 112. The firmware computes a difference 114 between the time-stamped sync mark detect signal 110 and an expected time 116 to thereby generate a coarse timing recovery measurement 118 used to synchronize the servo write clock 58. In the embodiment of FIG. 8, the expected time 116 comprises a table of expected module-N count values corresponding to the expected values of the modulo-N counter 90 at each sync mark. The write oscillator 72 is shown as a separate component in the embodiment of FIG. 11; however, in one embodiment the write oscillator 72 is integrated into the read channel 106 or the controller 112.

The controller 112 also receives fine timing recovery information 120 generated by fine timing recovery circuitry 122 within the read channel 106. In the embodiment of FIG. 8, the fine timing recovery information 122 comprises the phase error φ84 between the read signal sample values 64 (arrows in FIG. 9) and expected sample values 88 (circles in FIG. 9). The phase error φ84 received by the controller 112 is combined 124 with the coarse timing recovery measurement 118 to generate a composite timing recovery measurement 125 filtered by loop filter 100 implemented in firmware.

Computing the coarse timing recovery measurement 118 in firmware increases the flexibility of the timing recovery algorithm while decreasing the cost and complexity of the circuitry employed in the read channel 106. In addition, implementing the loop filter 100 in firmware allows for more sophisticated (e.g., non-linear) operations to account for anomalies in the coarse timing recovery measurement 118 (such as large transients due to media defects). Yet further advantages realized by implementing timing recovery in firmware include computing (at least partially) the fine timing recovery measurement in firmware as well as a feed-forward compensation value to compensate for repeatable phase error in the composite timing recovery measurement 125.

Figure 12:
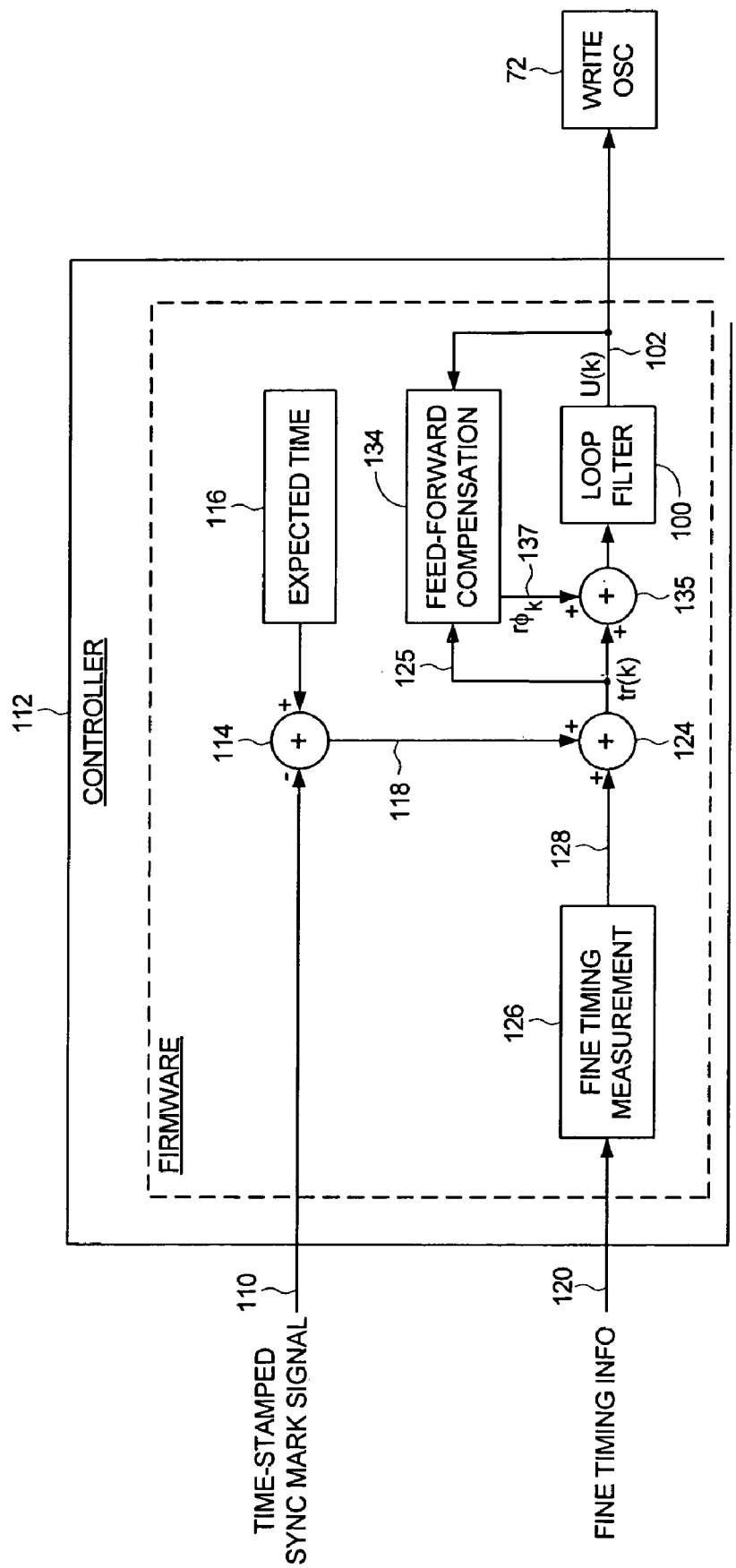
FIG. 12 shows an embodiment of the present invention wherein the controller comprises firmware for generating feed-forward compensation values to compensate for repeatable phase errors due to errors in the position of the sync marks from track to track.

FIG. 12 illustrates an embodiment wherein the controller 112 generates a fine timing recovery measurement in firmware in response to the fine timing recovery information 120 received from the read channel 106. For example, the fine timing recovery information 120 received from the read channel 106 may comprise trigonometric information (e.g., sin and cosine values) processed in firmware (e.g., by computing an arctangent in firmware) to generate the fine timing recovery measurement 128. Implementing complex computations in firmware block 126 (such as an arctangent) reduces the cost and complexity of the read channel 106.

Yet another benefit illustrated in the embodiment of FIG. 12 is the ability to generate a table of feed-forward compensation values in firmware (block 134) to compensate for repeatable phase errors due to position errors in the sync marks from track to track. Referring again to FIG. 6, the sync marks in the spiral tracks 20 are shown as having perfect radial alignment from the outer diameter tracks to the inner diameter tracks. In reality, the position of the sync marks will vary from track to track due to a number of factors, such as disk expansion and vibrations in the clock head 46 (FIG. 3A) while writing the spiral tracks 20 to the disk. The position errors in the sync marks from track to track will result in a repeatable phase error in the composite timing recovery measurement 125. To compensate for this repeatable phase error, the firmware generates a table of feed-forward compensation values (stored in block 134) which are used to adjust the composite timing recovery measurement 125 at adder 135. When the composite timing recovery measurement 125 is generated for a particular sync mark, it is adjusted at adder 135 by adding the corresponding feed-forward compensation value $r\phi_k$ 137.

Figure 13:
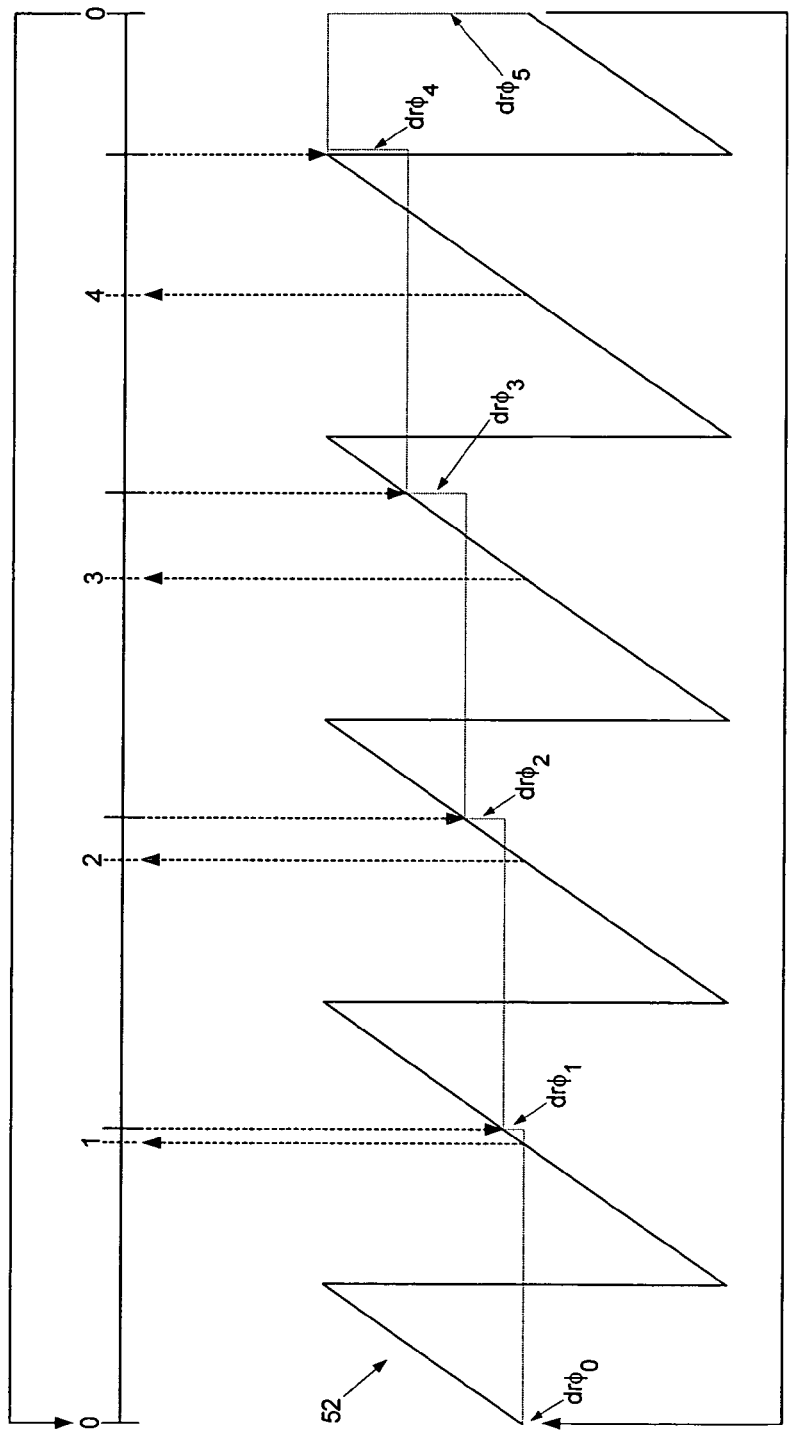
FIGS. 13A–13B illustrate computation of the repeatable phase errors when the servo write clock is synchronized to the rotational frequency of the disk and the phase locked loop (PLL) is running open loop.

FIGS. 13A–13B illustrate the computation of the repeatable phase error and corresponding feed-forward compensation value when the PLL is operated open loop. FIG. 13A shows a servo track wherein the desired position of the sync marks is shown in dashed lines and the actual position of the sync marks is shown in solid lines. In the example, there are five sync marks in the reference pattern distributed around the disk. FIG. 13B shows the saw-tooth waveform 52 generated by clocking the modulo-N counter wherein the target module-N counter value corresponding to the desired location of the sync marks is N/2 (the middle of the ramp). Due to the position error in writing the sync marks, the actual modulo-N counter value will deviate from N/2 reflecting the repeatable phase error. The repeatable phase error increment $dr\phi$ (from sync mark to sync mark):

$$dr\phi_{k+1} = STS(k) - STS(k+1) \tag{1}$$

where STS or "servo time stamp" is the value of the modulo-N counter when the corresponding sync mark is detected (i.e., the k and k+1 sync marks). The repeatable phase error (and corresponding feed-forward compensation value) for the kth sync mark (from k=1 to k=4):

$$r\phi_k = \sum_{i=1}^{k} dr\phi_i \tag{2}$$

In one embodiment, the modulo-N counter 90 (FIG. 8) is initialized (e.g., to N/2) at the first sync mark (k=0) and therefore the repeatable phase error $r\phi_0$ for the first sync mark is zero.

Figure 14:
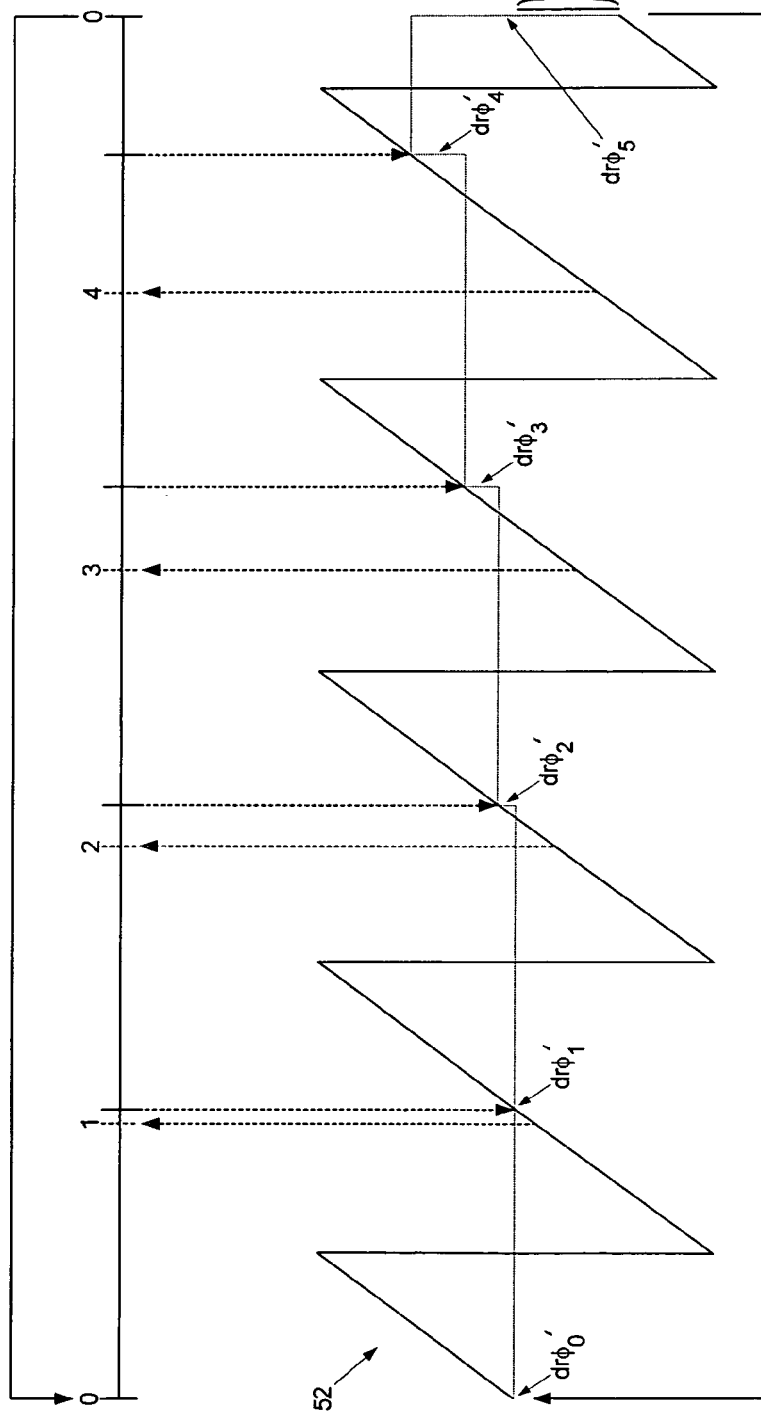
FIGS. 14A–14B illustrate computation of the repeatable phase errors when the servo write clock is not synchronized to the rotational frequency of the disk resulting in a DC phase error.

In the example embodiment of FIGS. 13A–13B, the open loop frequency (center frequency $U_0$) of the write oscillator 72 generates the servo write clock 58 at the target sync mark frequency (which is tied to the rotational speed of the disk). FIGS. 14A–14B illustrate an embodiment wherein the center frequency $U_0$ of the write oscillator 72 generates the servo write clock 58 slightly offset from the target sync mark frequency resulting in a DC_OFFSET phase error. The DC_OFFSET phase error induced into each cycle of the modulo-N counter:

$$DC\_OFFSET = \left( \sum_{i=1}^{N} dr\phi_i' \right) \div N \tag{3}$$

where N is the number of sync marks (five in FIG. 14A) and $dr\phi_i' = DC\_OFFSET + dr\phi_i$. Therefore, the repeatable phase error (and corresponding feed-forward compensation value) for the kth sync mark (from k=1 to k=4):

$$r\phi_k = \sum_{i=0}^{k} (dr\phi_i' - DC\_OFFSET) \quad (4)$$

Due to non-repeatable phase errors (e.g., disk speed variations), the repeatable phase errors are estimated while the PLL is operating closed loop (i.e., generating a frequency control signal U(k) in response to the timing recovery measurement). The expected phase error increment $ed\phi$ when the PLL operates closed loop:

$$ed\phi_{k+1} = DC\_OFFSET + U(k) + dr\phi_{k+1} \quad (5)$$

where DC_OFFSET is described above, U(k) is the frequency control signal (102 in FIG. 12) applied during the interval after the kth sync mark, and $dr\phi_{k+1}$ is the repeatable phase error increment associated with the k+1 sync mark. The measured phase error increment $md\phi$ when the PLL operates closed loop:

$$md\phi_{k+1} = STS(k) - STS(k+1) \quad (6)$$

Setting equation (5) equal to equation (6) and solving for $DC\_OFFSET + dr\phi_{k+1}$:

$$dr\phi_{k+1}' = DC\_OFFSET + dr\phi_{k+1} = STS(k) - STS(k+1) - U(k) \quad (7)$$

The phase error $r\phi_k'$ for the kth sync mark (from k=1 to k=N−1):

$$r\phi_k' = \sum_{i=1}^{k} dr\phi_i' \quad (8)$$

Therefore, the repeatable phase error $r\phi_k$ (and corresponding feed-forward compensation value) for the kth sync mark (from k=1 to k=N−1):

$$r\phi_k = \sum_{i=1}^{k} (dr\phi_i' - DC\_OFFSET) \quad (9)$$

where DC_OFFSET is computed from equation (3).

The estimate of the repeatable phase error is improved by including the fine phase error measurement into the above equations. Equation (7) becomes:

$$dr\phi_{k+1}' = DC\_OFFSET + dr\phi_{k+1} = tr(k) - tr(k+1) - U(k) \quad (10)$$

where tr(k) is the composite timing recovery measurement 125 in FIG. 12. Therefore, the table of feed-forward compensation values stored in block 134 of FIG. 12 can be computed according to equations (9) and (10) by measuring tr(k), tr(k+1) and U(k) for each sync mark over a revolution of the disk. In one embodiment, the estimate of phase error increment $dr\phi_{k+1}'$ is improved by averaging the values tr(k), tr(k+1), and U(k) over several revolutions of the disk, wherein the modulo-N counter 90 is reset (e.g., to N/2) when the first sync mark (k=0) is detected at the beginning of each revolution.

Figure 15:
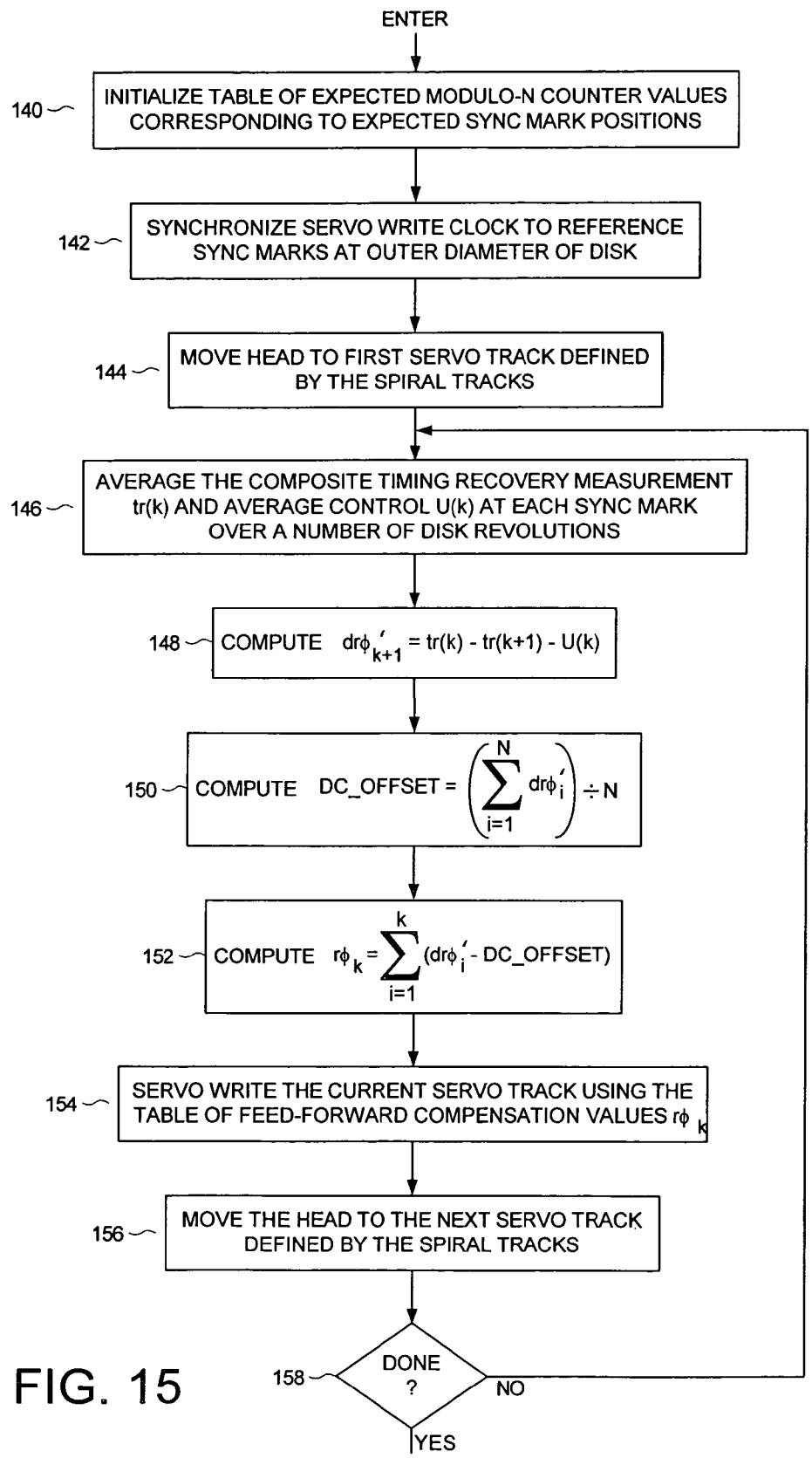
FIG. 15 is a flow diagram according to an embodiment of the present invention for computing feed-forward compensation values in response to the composite phase error and the frequency control signal U(k) to compensate for repeatable phase error.

FIG. 15 is a flow diagram according to an embodiment of the present invention for computing the feed-forward compensation values $r\phi_k$ 137 and writing the product servo sectors to the disk using the feed-forward compensation values $r\phi_k$ 137. At step 140 the table of expected modulo-N counter values 116 in FIG. 12 is initialized to values corresponding to the expected locations of the sync marks. At step 142 the servo write clock 58 is synchronized to reference sync marks recorded at an initial radial location on the disk 18. More details concerning the reference sync marks are disclosed in the above referenced patent application entitled "USING AN EXTERNAL SPIRAL SERVO WRITER TO WRITE REFERENCE SERVO SECTORS AND SPIRAL TRACKS TO A DISK TO FACILITATE WRITING PRODUCT SERVO SECTORS TO THE DISK". At step 144 the head is moved radially inward to the first servo track defined by the spiral tracks. At step 146 the composite timing recovery measurement tr(k) and tr(k+1) and the frequency control signal U(k) are averaged for each sync mark over several revolutions of the disk. At step 148 the phase error increments $dr\phi_{k+1}'$ are computed according to equation (10), and at step 150 the DC_OFFSET is computed according to equation (3). At step 152 the feed-forward compensation values $r\phi_k$ 137 are computed according to equation (9). At step 154 the product servo sectors are written to the current servo track using the feed-forward compensation values $r\phi_k$ 137 computed at step 152. At step 156 the head is moved to the next servo track, and the procedure repeats starting at step 146 until all of the servo tracks are servo written at step 158.

Figure 16A:
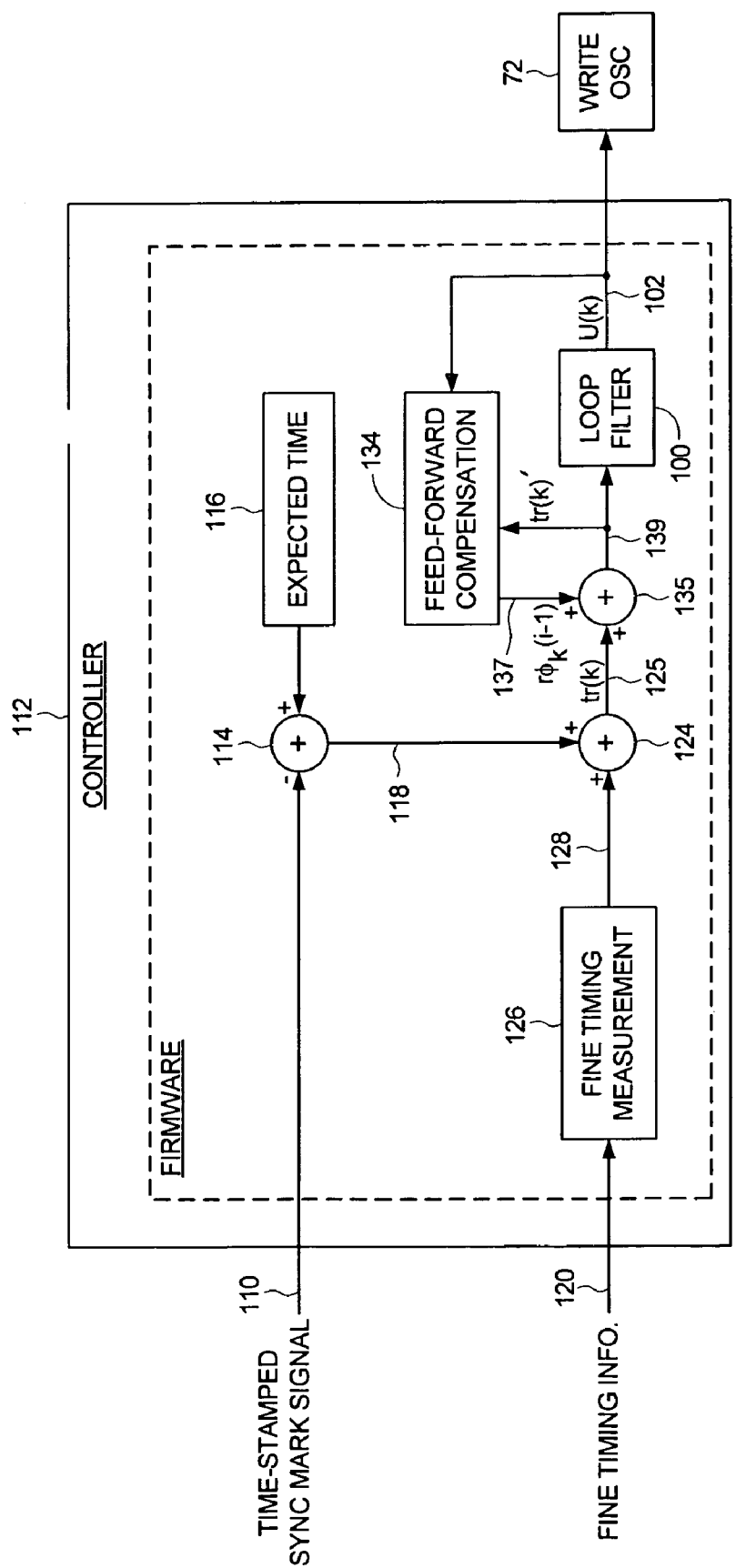
FIGS. 16A–16B show an embodiment of the present invention wherein the feed-forward compensation values generated for a previous servo track are used to generate the feed-forward compensation values for servo writing a next servo track.
Figure 16B:
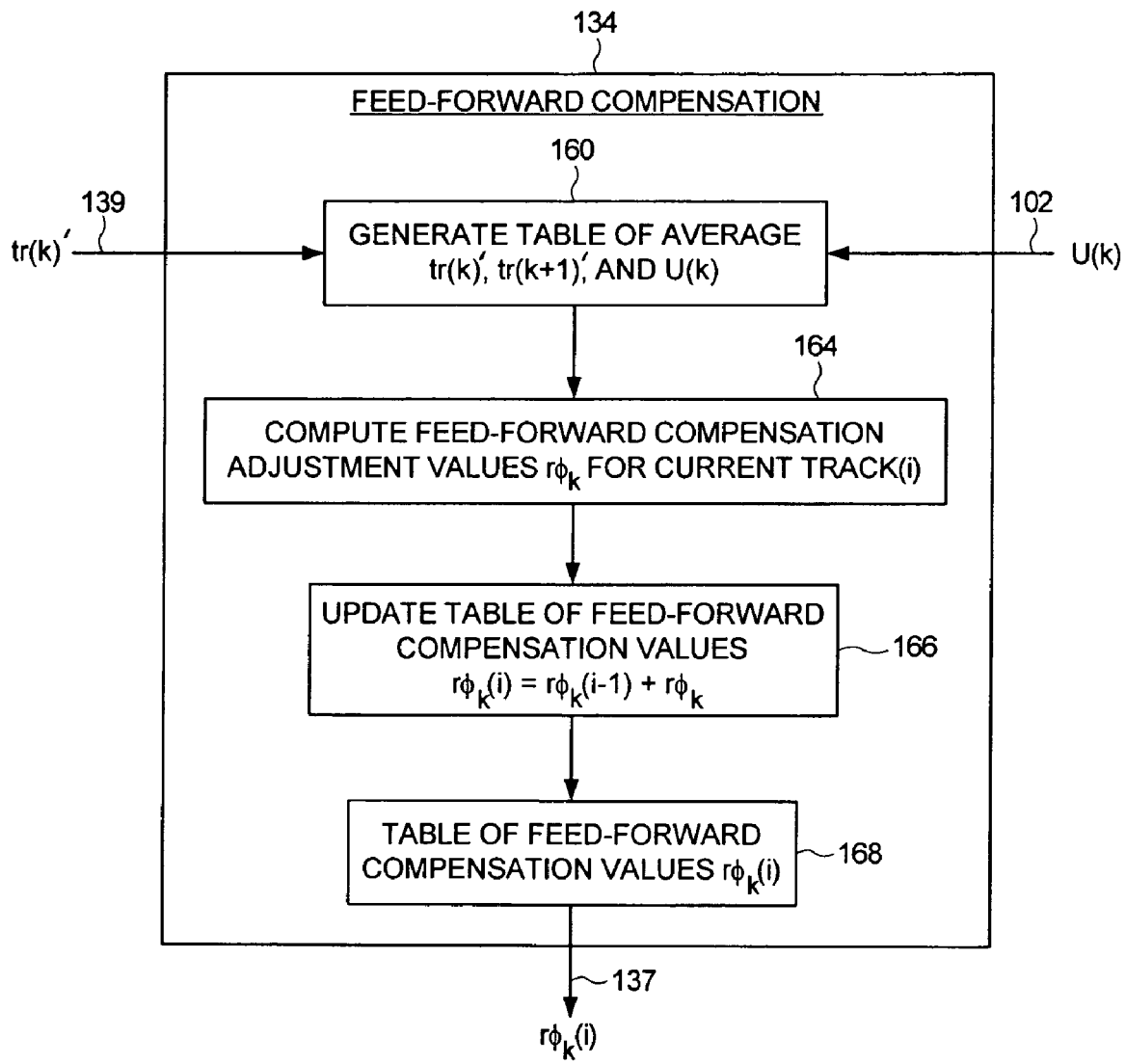

In one embodiment, the feed-forward compensation values generated for a previous servo track are used to generate feed-forward compensation adjustment values for servo writing a next servo track. This embodiment is illustrated in FIG. 16A which shows the feed-forward compensation values $r\phi_k(i-1)$ 137 for servo writing servo track (i−1) being used to adjust the composite timing recovery measurement tr(k) 125 to generate an adjusted composite timing recovery measurement tr(k)' 139 for servo track (i). Referring to FIG. 16B, at step 160 a table is generated of average values for tr(k)', tr(k+1)' and U(k) for each sync mark over multiple revolutions of the disk for servo track (i). At step 164 the feed-forward compensation adjustment values $r\phi_k$ are computed for servo track (i) according to the above equations, and at step 166 the table of feed-forward compensation values 168 for servo track (i) are updated:

$$r\phi_k(i) = r\phi_k(i-1) + r\phi_k \quad (11)$$

The product servo sectors are then written to servo track (i) using the updated feed-forward compensation values $r\phi_k(i)$ 137 stored in table 168. Computing feed-forward compensation adjustment values improves convergence by effectively increasing the number of revolutions performed to compute the average values for tr(k), tr(k+1) and U(k) at step 146 of FIG. 15.

In one embodiment, equation (10) is modified to account for the delay in computing the frequency control signal U(k):

$$dr\phi_{k+1}' = DC\_OFFSET + dr\phi_{k+1} = tr(k) - tr(k+1) - [cd \cdot U(k-1) + (1-cd) \cdot U(k)] \quad (12)$$

where cd is a fractional value representing the computational delay in computing U(k) for the k+1 sync mark interval. That is, the frequency control signal U(k−1) computed for the previous (k) sync mark interval is applied to the write oscillator 72 for a fraction (cd) of the k+1 sync mark interval, and then the newly computed frequency control signal U(k) is applied to the write oscillator 72 for the remainder (1−cd) of the k+1 sync mark interval.

In the embodiments disclosed in FIGS. 13A–13B and 14A–14B, the repeatable phase errors $r\phi_k$ are computed relative to target sync marks (dotted lines in FIGS. 13A and 14A) as determined from an initial (k=0) sync mark. In another embodiment, the repeatable phase errors $r\phi_k$ are adjusted by the average or DC value so that the target sync marks correspond to an "average flat track" which may improve signal-to-noise ratio (SNR). The average or DC repeatable phase error:

$$DC\_R\phi = \left(\sum_{i=1}^{N} r\phi_i\right) \div N \tag{13}$$

and the adjusted repeatable phase error:

$$r\phi_k = r\phi_k - DC\_R\phi \tag{14}$$

In one embodiment, the estimate of the repeatable phase error may be improved by removing the first and/or second harmonics from the computed repeatable phase errors $r\phi_k$. This can be accomplished by computing the single-point discrete-time Fourier transform (DTFT) to extract the first and/or second harmonics, computing the inverse DTFT, and subtracting the time domain result from $r\phi_k$.

Figure 17:
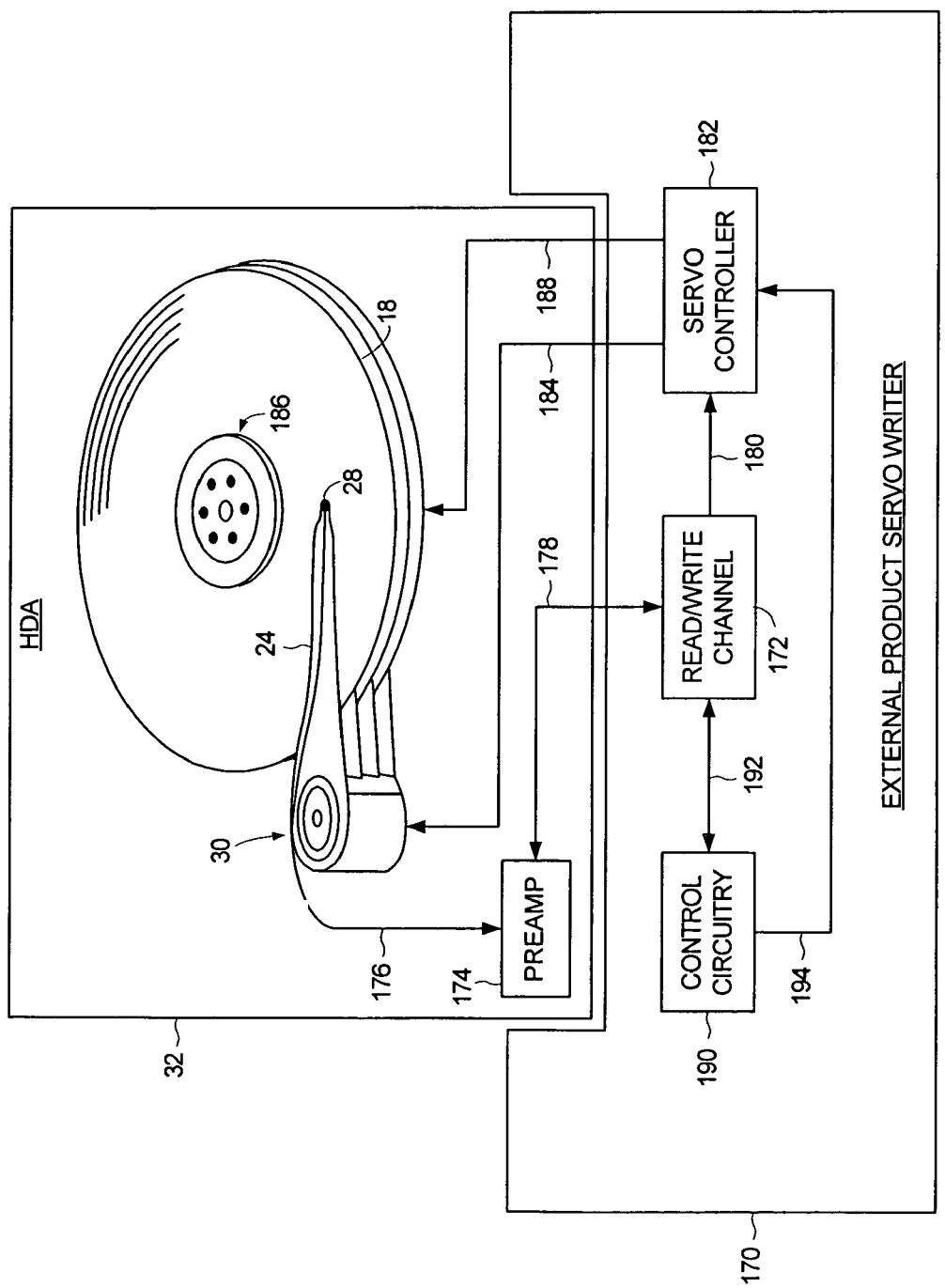
FIG. 17 shows an embodiment of the present invention wherein an external product servo writer is used to process the spiral tracks in order to write the product servo sectors to the disk.
Figure 18:
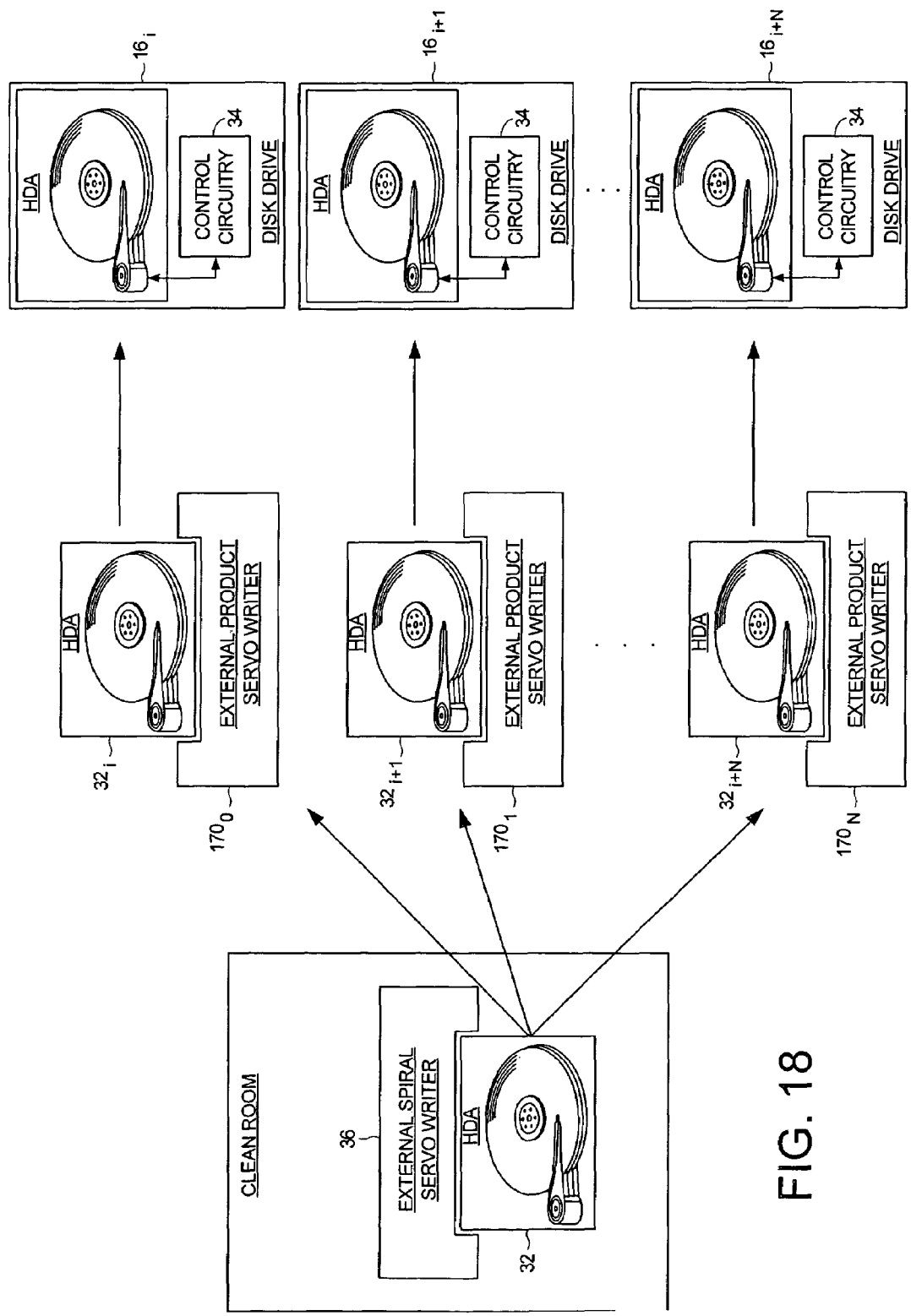
FIG. 18 shows an embodiment of the present invention wherein an external spiral servo writer is used to write the spiral tracks, and a plurality of external product servo writers write the product servo sectors for the HDAs output by the external spiral servo writer.

FIG. 17 shows an embodiment of the present invention wherein after writing the spiral tracks $20_0$–$20_N$ to the disk 18 (FIGS. 3A–3B), the HDA 32 is inserted into an external product servo writer 170 comprising suitable circuitry for reading and processing the spiral tracks $20_0$–$20_N$ in order to write the product servo sectors $56_0$–$56_N$ to the disk 18. The external product servo writer 170 comprises a read/write channel 172 for interfacing with a preamp 174 in the HDA 32. The preamp 174 amplifies a read signal emanating from the head 28 over line 176 to generate an amplified read signal applied to the read/write channel 172 over line 178. The read/write channel 172 comprises circuitry for generating servo burst signals 180 from the high frequency signal 22 (FIG. 5B) in the spiral tracks $20_0$–$20_N$, wherein the servo burst signals are applied to a servo controller 182. The servo controller 182 processes the servo burst signals 180 to generate the PES. The PES is processed to generate a VCM control signal applied to the VCM 30 over line 184 in order to maintain the head 28 along a circular path while writing the product servo sectors $56_0$–$56_N$. The servo controller 182 also generates a spindle motor control signal applied to a spindle motor 186 over line 188 to maintain the disk 18 at a desired angular velocity. Control circuitry 190 processes information received from the read/write channel 172 over line 192 associated with the spiral tracks $20_0$–$20_N$ (e.g., timing information) and provides the product servo sector data to the read/write channel 172 at the appropriate time. The product servo sector data is provided to the preamp 174 which modulates a current in the head 28 in order to write the product servo sectors $56_0$–$56_N$ to the disk 18. The control circuitry 190 also transmits control information over line 194 to the servo controller 182 such as the target servo track to be written. After writing the product servo sectors $56_0$–$56_N$ to the disk 18, the HDA 32 is removed from the external product servo writer 170 and a printed circuit board assembly (PCBA) comprising the control circuitry 34 (FIG. 3A) is mounted to the HDA 32.

Figure 19:
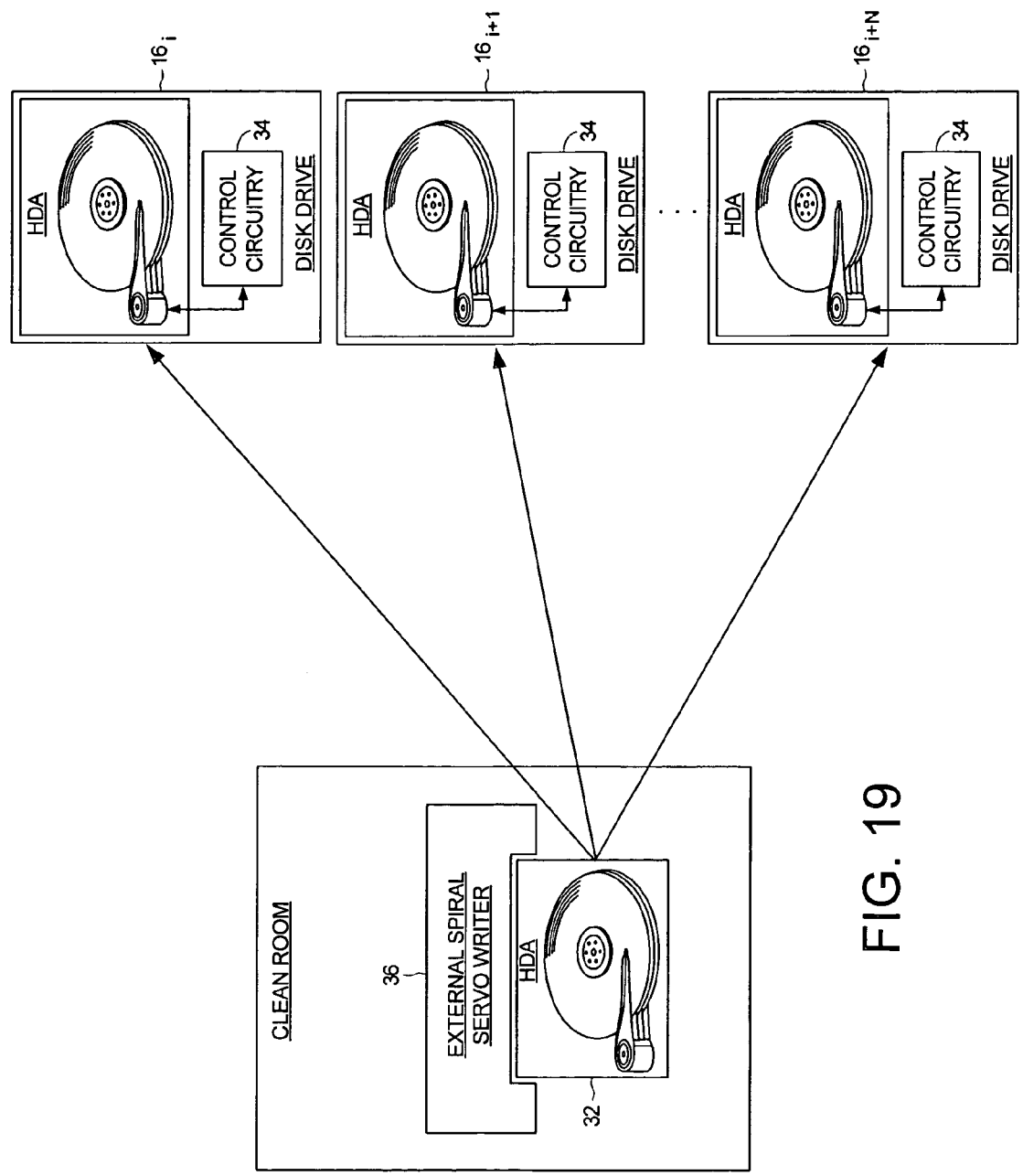
FIG. 19 shows an embodiment of the present invention wherein an external spiral servo writer is used to write the spiral tracks, and the control circuitry within each product disk drive is used to write the product servo sectors.

In one embodiment, the external product servo writer 170 of FIG. 17 interfaces with the HDA 32 over the same connections as the control circuitry 34 to minimize the modifications needed to facilitate the external product servo writer 170. The external product servo writer 170 is less expensive than a conventional servo writer because it does not require a clean room or sophisticated head positioning mechanics. In an embodiment shown in FIG. 18, a plurality of external product servo writers $170_0$–$170_N$ process the HDAs $32_i$–$32_{i+N}$ output by an external spiral servo writer 36 in order to write the product servo sectors less expensively and more efficiently than a conventional servo writer. In an alternative embodiment shown in FIG. 19, an external spiral servo writer 36 is used to write the spiral tracks, and the control circuitry 34 within each product disk drive $16_i$–$16_{i+N}$ is used to write the product servo sectors.

We claim:

1. A method of writing product servo sectors on a disk of a disk drive, the disk drive comprising control circuitry and a head disk assembly (HDA) comprising the disk, an actuator arm, a head coupled to a distal end of the actuator arm, and a voice coil motor for rotating the actuator arm about a pivot to position the head radially over the disk, the disk comprising a reference pattern having a plurality of sync marks written around the disk, the method comprising the steps of:

(a) using the head internal to the disk drive to read the reference pattern to generate a read signal;

(b) detecting the sync marks from the read signal to generate a sync mark detect signal;

(c) generating a timing recovery measurement in response to the sync mark detect signal;

(d) generating a frequency control signal in response to the timing recovery measurement;

(e) generating a servo write clock in response to the frequency control signal;

(f) generating a feed-forward compensation value in response to the timing recovery measurement and the frequency control signal;

(g) adjusting the timing recovery measurement in response to the feed-forward compensation value to compensate for a repeatable phase error in the timing recovery measurement; and (h) using the servo write clock and the head internal to the disk drive to write the product servo sectors to the disk.

2. The method as recited in claim 1, wherein the repeatable phase error is caused by a position error in the sync marks written on the disk.

3. The method as recited in claim 1, wherein the reference pattern comprises a high frequency signal interrupted periodically by one of the sync marks.

4. The method as recited in claim 3, wherein:

(a) the disk comprises a plurality of spiral tracks; and (b) each spiral track comprises the high frequency signal interrupted periodically by one of the sync marks.

5. The method as recited in claim 3, wherein the step of generating the timing recovery measurement comprises the step of generating a coarse timing recovery measurement from the sync mark detect signal and a fine timing recovery measurement from the high frequency signal.

6. The method as recited in claim 1, wherein the step of generating the feed-forward compensation value comprises the steps of:

(a) computing a plurality of timing recovery measurements tr(k) corresponding to a plurality of the sync marks; and (b) computing a plurality of phase error increments $dr\phi_{k+1}'$ according to:

$$dr\phi_{k+1}'=tr(k)-tr(k+1)-U(k)$$

where $U(k)$ is the frequency control signal.

7. The method as recited in claim 6, wherein the step of generating the feed-forward compensation value further comprises the steps of:
(a) computing a DC_OFFSET phase error according to:

$$DC\_OFFSET = \left(\sum_{i=1}^{N} dr\phi_i'\right) \div N;$$

and
(b) computing a plurality of feed-forward compensation values $r\phi_k$ corresponding to the plurality of the sync marks according to:

$$r\phi_k = \sum_{i=1}^{k} (dr\phi_i' - DC\_OFFSET).$$

8. The method as recited in claim 1, wherein:
(a) the step of writing the product servo sectors to the disk defines a plurality of tracks on the disk; and
(b) the feed-forward compensation values generated while writing the product servo sectors to a first track are used to generate the feed-forward compensation values to write the product servo sectors to a second track.

9. A disk drive comprising:
(a) a disk comprising a reference pattern having a plurality of sync marks written around the disk;
(b) an actuator arm;
(c) a head coupled to a distal end of the actuator arm;
(d) a voice coil motor for rotating the actuator arm about a pivot to position the head radially over the disk; and
(e) control circuitry for:
using the head internal to the disk drive to read the reference pattern to generate a read signal;
detecting the sync marks from the read signal to generate a sync mark detect signal;
generating a timing recovery measurement in response to the sync mark detect signal;
generating a frequency control signal in response to the timing recovery measurement;
generating a servo write clock in response to the frequency control signal;
generating a feed-forward compensation value in response to the timing recovery measurement and the frequency control signal;
adjusting the timing recovery measurement in response to the feed-forward compensation value to compensate for a repeatable phase error in the timing recovery measurement; and
using the servo write clock and the head internal to the disk drive to write the product servo sectors to the disk.

10. The disk drive as recited in claim 9, wherein repeatable phase error is caused by a position error in the sync marks written on the disk.

11. The disk drive as recited in claim 9, wherein the reference pattern comprises a high frequency signal interrupted periodically by one of the sync marks.

12. The disk drive as recited in claim 11, wherein:
(a) the disk comprises a plurality of spiral tracks; and
(b) each spiral track comprises the high frequency signal interrupted periodically by one of the sync marks.

13. The disk drive as recited in claim 11, wherein the control circuitry generates the timing recovery measurement by generating a coarse timing recovery measurement from the sync mark detect signal and a fine timing recovery measurement from the high frequency signal.

14. The disk drive as recited in claim 9, wherein the control circuitry generates the feed-forward compensation value by:
(a) computing a plurality of timing recovery measurements $tr(k)$ corresponding to a plurality of the sync marks; and
(b) computing a plurality of phase error increments $dr\phi_{k+1}'$ according to:

$$dr\phi_{k+1}'=tr(k)-tr(k+1)-U(k)$$

where $U(k)$ is the frequency control signal.

15. The disk drive as recited in claim 14, wherein the control circuitry generates the feed-forward compensation value by:
(a) computing a DC_OFFSET phase error according to:

$$DC\_OFFSET = \left(\sum_{i=1}^{N} dr\phi_i'\right) \div N$$

(b) computing a plurality of feed-forward compensation values $r\phi_k$ corresponding to the plurality of the sync marks according to:

$$r\phi_k = \sum_{i=1}^{k} (dr\phi_i' - DC\_OFFSET).$$

16. The disk drive as recited in claim 9, wherein:
(a) the step of writing the product servo sectors to the disk defines a plurality of tracks on the disk; and
(b) the feed-forward compensation values generated while writing the product servo sectors to a first track are used to generate the feed-forward compensation values to write the product servo sectors to a second track.

* * * * *